(12) United States Patent
Hashi et al.

(10) Patent No.: US 7,970,266 B2
(45) Date of Patent: Jun. 28, 2011

(54) CAMERA

(75) Inventors: Hideyuki Hashi, Osaka (JP); Kenichi Hayashi, Nara (JP); Hironori Honsho, Hyogo (JP); Masanobu Tanaka, Osaka (JP); Kazuo Sibukawa, Osaka (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/774,010

(22) Filed: May 5, 2010

(65) Prior Publication Data

US 2010/0215353 A1    Aug. 26, 2010

Related U.S. Application Data

(63) Continuation of application No. PCT/JP2008/003238, filed on Nov. 7, 2008.

(30) Foreign Application Priority Data

Nov. 9, 2007  (JP) ................................. 2007-292643

(51) Int. Cl.
*G03B 17/00* (2006.01)
*H04N 5/228* (2006.01)

(52) U.S. Cl. ...................................... 396/55; 348/208.4

(58) Field of Classification Search .................... 396/50, 396/52–55; 348/208.99, 208.1, 208.2, 208.4, 348/208.5, 208.7, 208.11
See application file for complete search history.

(56) References Cited

U.S. PATENT DOCUMENTS

| | | | |
|---|---|---|---|
| 4,623,930 A | 11/1986 | Oshima et al. | |
| 5,155,520 A * | 10/1992 | Nagasaki et al. | ............... 396/53 |
| 5,649,237 A | 7/1997 | Okazaki | |
| 5,852,750 A | 12/1998 | Kai et al. | |
| 7,324,134 B2 * | 1/2008 | Sato et al. | .................. 348/208.2 |
| 2005/0276589 A1 | 12/2005 | Seo | |
| 2006/0098967 A1 | 5/2006 | Togawa | |
| 2007/0147813 A1 | 6/2007 | Washisu | |
| 2007/0183766 A1 | 8/2007 | Miyamori et al. | |

FOREIGN PATENT DOCUMENTS

| | | |
|---|---|---|
| JP | 63-099680 A | 4/1988 |
| JP | 01-53957 B | 11/1989 |
| JP | 1-291165 | 11/1989 |
| JP | 03-37616 A | 2/1991 |

(Continued)

OTHER PUBLICATIONS

International Search Report of PCT Application No. PCT/JP2008/003238 dated Feb. 17, 2009.

(Continued)

*Primary Examiner* — Clayton E. LaBalle
*Assistant Examiner* — Minh Q Phan
(74) *Attorney, Agent, or Firm* — Panasonic Patent Center; Dhiren Odedra; Kerry Culpepper

(57) ABSTRACT

A camera includes an optical system, a housing, an image blur corrector, a displacement acquisition section, a rotary driver, a correction computer, and a drive controller. The displacement acquisition section is configured to acquire the amount of displacement of the housing. The rotary driver is configured to rotationally drive the displacement acquisition section with respect to the housing. The correction computer is configured to calculate a first correction amount at the image blur corrector from the displacement amount acquired by the displacement acquisition section. The drive controller is configured to control the operation of the rotary driver, and also controls the operation of the image blur corrector on the basis of the first correction amount.

5 Claims, 32 Drawing Sheets

FOREIGN PATENT DOCUMENTS

| | | |
|---|---|---|
| JP | 03-46642 A | 2/1991 |
| JP | 06-30327 A | 2/1994 |
| JP | 6-317605 | 11/1994 |
| JP | 09-46575 A | 2/1997 |
| JP | 10-254006 | 9/1998 |
| JP | 2000-227615 A | 8/2000 |
| JP | 3513950 B | 1/2004 |
| JP | 2004-295027 A | 10/2004 |
| JP | 2005-003719 A | 1/2005 |
| JP | 2005-352113 A | 12/2005 |
| JP | 2006-337680 A | 12/2006 |
| JP | 2007-033740 A | 2/2007 |
| JP | 2007-58160 A | 3/2007 |
| JP | 2007-171786 A | 7/2007 |
| JP | 2007-241254 A | 9/2007 |

OTHER PUBLICATIONS

Nishi, Kazuki et al. "3D Camera-Shake Measurement and Analysis" *Technical Report of IEICE. PRMU*, vol. 106, No. 470(Jan. 12, 2007), pp. 49-54.

* cited by examiner

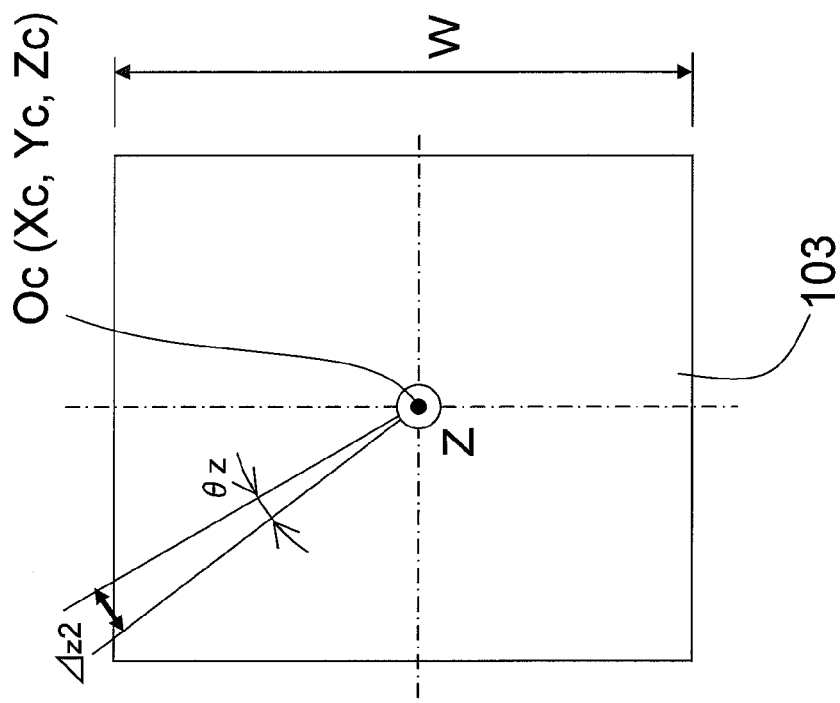
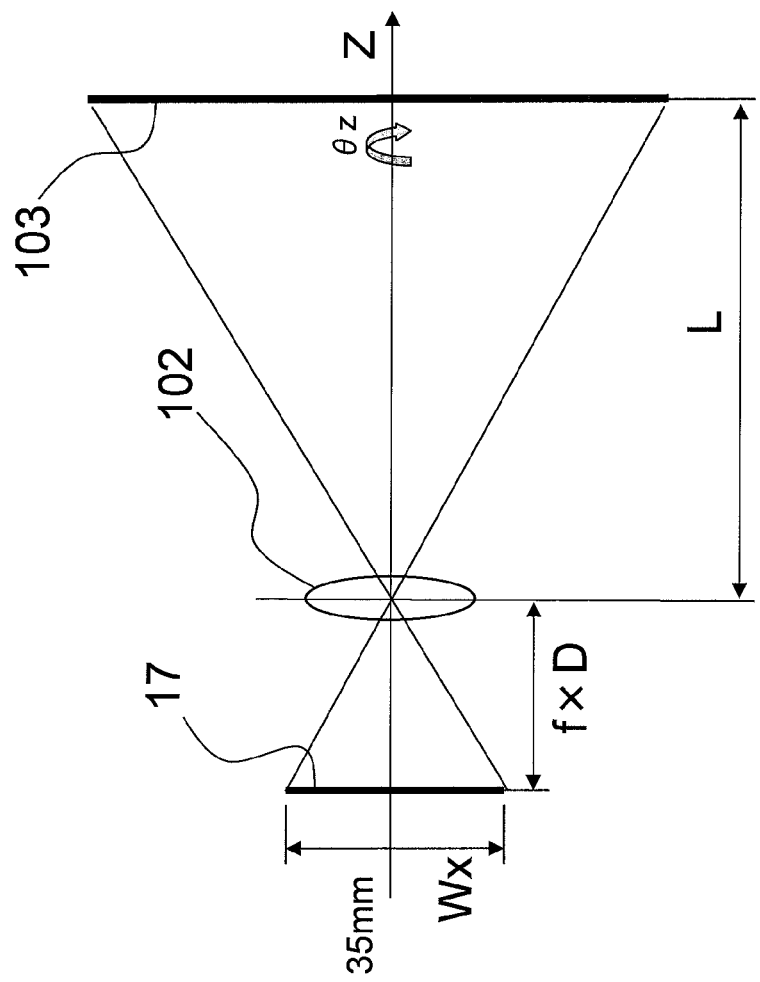
FIG. 7B
FIG. 7A

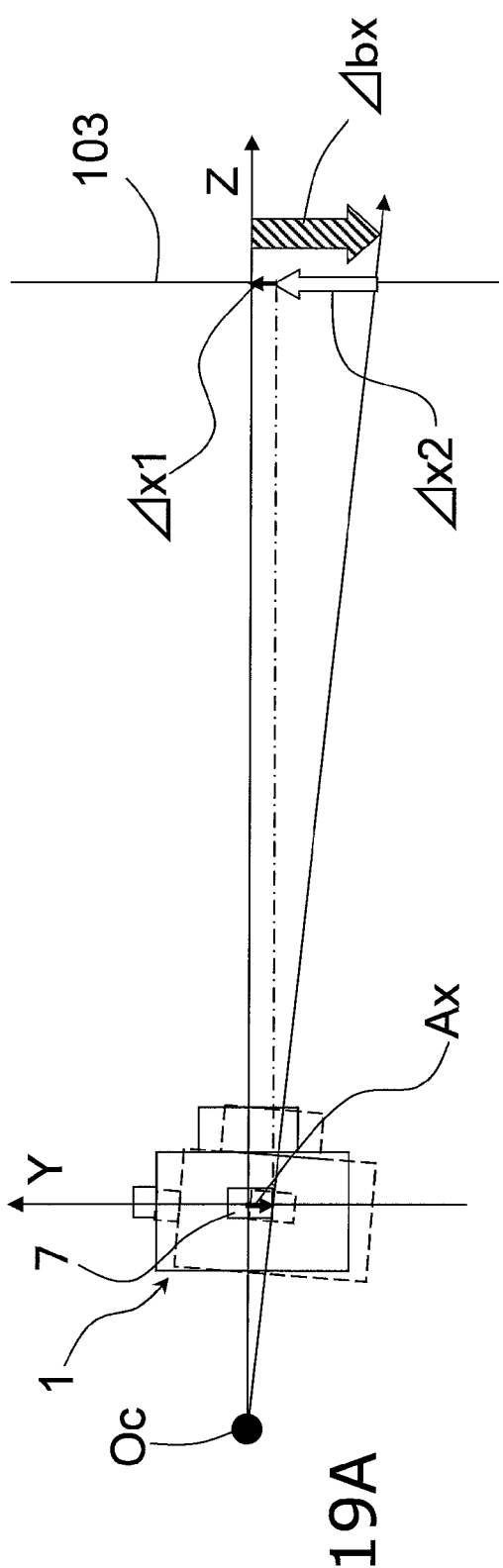
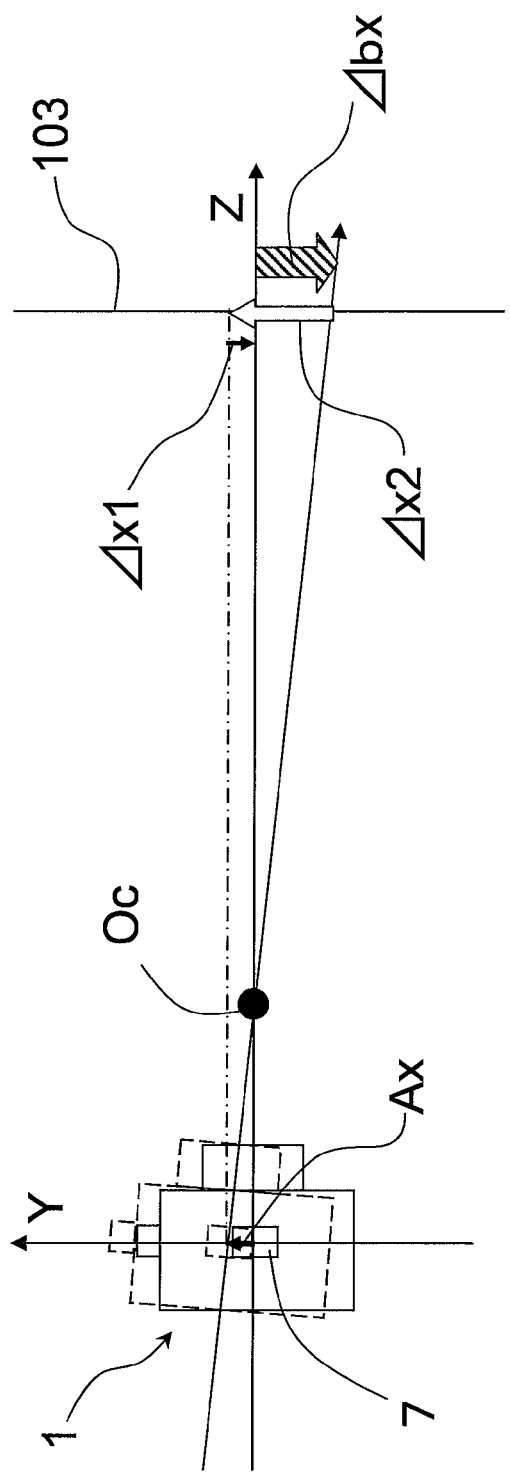

CAMERA

CROSS-REFERENCE TO RELATED APPLICATIONS

This application is a continuation of International Patent Application No. PCT/JP2008/003238 filed on Nov. 7, 2008. The entire disclosure of International Patent Application No. PCT/JP2008/003238 is hereby incorporated herein by reference.

This application claims priority to Japanese Patent Application No. 2007-292643 filed on Nov. 9, 2007. The entire disclosure of Japanese Patent Application No. 2007-292643 is hereby incorporated herein by reference.

BACKGROUND

1. Technical Field

The technology disclosed herein relates to a camera having an image blur correction function.

2. Description of the Related Art

A camera having an image blur correction function in order to suppress the image degradation caused by shaking of the camera (hereinafter also referred to as image blur) was known in the past. Such a camera had an image blur correction unit for driving a correcting lens, a shake detection sensor for detecting shaking of the camera, and a correction controller for controlling the operation of the image blur correction unit according to the output of the shake detection sensor. With this camera, the correcting lens is driven by the image blur correction unit on the basis of the amount of shake detected by the image blur detection sensor, so as to cancel out the image blur caused by this shaking, which means that it is possible to acquire images in which image blur is corrected.

More specifically, with a conventional camera, the X and Y axes, which are perpendicular to the axis of incident light of the optical system, are set with respect to the camera body. This camera has a first shake detection sensor for detecting the angular velocity (shake) of the camera body around the X axis, and a second shake detection sensor for detecting the angular velocity (shake) of the camera body around the Y axis. The correction controller can detect the rotational angle of the camera around the X and Y axes by means of the first and second shake detection sensors. The amount by which the correcting lens is driven is computed by a microcomputer to correct any blurring caused by camera shake. The correcting lens is driven by a drive unit on the basis of this drive amount (see Patent Citation 1, for example).

To correct image blur more accurately, a camera has also been proposed in which translational shake of the camera body is detected in addition to detecting the rotational angle (shake) around the X and Y axes (see Patent Citations 2 and 3, for example). Another camera has been proposed which has a sensor for detecting inclination or the rotational angle (shake) around the optical axis of the camera body (see Patent Citations 4 and 5). With this camera, the imaging element is driven so as to cancel out image blur caused by inclination or shake of the camera body around the optical axis. Consequently, an image can be acquired in which inclination or image blur around the optical axis has been corrected.

Patent Citation 1: Japanese Laid-Open Patent Application H3-37616

Patent Citation 2: Japanese Laid-Open Patent Application H3-46642

Patent Citation 3: Japanese Patent No. 3,513,950

Patent Citation 4: Japanese Laid-Open Patent Application H6-30327

Patent Citation 5: Japanese Patent Publication H1-53957

Patent Citation 6: Japanese Laid-Open Patent Application 2004-295027

SUMMARY

With a conventional camera, even if translational shake can be detected by an acceleration sensor, the gravitational acceleration component that is always acting on the camera affects the output as noise. Even if the gravitational acceleration component is eliminated ahead of time, since the acceleration sensor tilts with respect to the vertical direction along with the camera, the direction of gravitational acceleration acting on the acceleration sensor is not constant. Consequently, it is difficult to remove the gravitational acceleration component accurately, and there is a decrease in the precision of the acceleration detected by the acceleration sensor or the amount of displacement calculated from this acceleration. As a result, image blur correction performance may decrease with a conventional camera.

A camera according to a first aspect has an optical system, a housing, an image blur corrector, a displacement acquisition section, a rotary driver, a correction computer, and a drive controller. The optical system has a correcting optical system that performs image blur correction, and is configured to form an optical image of a subject. The image blur corrector is configured to correct image blur caused by movement of the housing. The displacement acquisition section is configured to acquire the amount of displacement of the housing. The rotary driver is configured to rotationally drive the displacement acquisition section with respect to the housing. The correction computer is configured to calculate a first correction amount at the image blur corrector from the displacement amount acquired by the displacement acquisition section. The drive controller is configured to control the operation of the rotary driver, and also controls the operation of the image blur corrector on the basis of the first correction amount.

With this camera, since the operation of the optical system driver is controlled by the drive controller on the basis of the first correction amount calculated by the correction computer, the correcting optical system can be driven according to the amount of movement of the camera. Consequently, image blur attributable to translational shaking of the camera can be corrected.

Here, since the displacement acquisition section is rotationally driven by the rotary driver, the orientation of the displacement acquisition section can be kept constant with respect to the vertical direction, which is the direction in which gravitational acceleration acts, for example. Consequently, the gravitational acceleration component can be eliminated ahead of time from the displacement amount acquired by the displacement acquisition section, and this improves the accuracy of the displacement amount acquired by the displacement acquisition section. That is, image blur correction performance can be further enhanced.

Possible image blur correctors include optical types in which the correcting optical system is moved, sensor shift types in which the imaging element is moved, and electronic types in which an image signal is subjected to image blur correction processing. Examples of cameras here include those that are capable of only still picture imaging, those capable of only moving picture imaging, and those capable of both still and moving picture imaging. Examples of cameras also include digital still cameras, interchangeable lens digital cameras, and digital video cameras.

A camera according to a second aspect is the camera according to the first aspect, wherein the displacement acquisition section overlaps the rotational axis of the rotary driver when viewed along the optical axis of the imaging optical system.

A camera according to a third aspect is the camera according to the second aspect, wherein the detection center of the displacement acquisition section substantially coincides with the rotational axis of the rotary driver when viewed along the optical axis.

The "detection center" referred to here is an imaginary point that is the center in the detection of the acceleration or displacement amount by the displacement acquisition section. If the displacement acquisition section is rectangular when viewed along the optical axis, the detection center substantially coincides with the center of this rectangle, for example. The phrase "the detection center of the displacement acquisition section substantially coincides with the rotational axis of the rotary driver when viewed along the optical axis" here encompasses a case in which the detection center completely coincides with the rotational axis, as well as a case in which the detection center is offset from the rotational axis to the extent that image blur correction performance is still improved.

A camera according to a fourth aspect is the camera according to the third aspect, further comprising an imaging element configured to convert an optical image of a subject into an image signal. The rotary driver has a rotor to which the imaging element and the displacement acquisition section are integrally rotatably provided, and a rotation actuator configured to drive the rotor with respect to the housing. The imaging element is disposed on the imaging optical system side of the rotor. The displacement acquisition section is disposed on the opposite side of the rotor from that of the imaging element.

A camera according to a fifth aspect is the camera according to the third aspect, further comprising an angle acquisition section configured to acquire the rotational angle of the housing. The correction computer is configured to calculate a second correction amount at the image blur corrector from the rotational angle acquired by the angle acquisition section, using the position of the displacement acquisition section as a reference. The drive controller is configured to control the operation of the image blur corrector on the basis of the first and second correction amounts.

A camera according to a sixth aspect is the camera according to the third aspect, further comprising an angle acquisition section. The angle acquisition section is configured to acquire the rotational angle of the housing. The image blur corrector has an optical system driver configured to drive the correcting optical system so that the optical path of the imaging optical system is changed, and an imaging element driver configured to drive the imaging element with respect to the housing so that the light receiving position of the optical image of the subject is changed. The correction computer is configured to calculate a second correction amount at the image blur corrector from the rotational angle acquired by the angle acquisition section. The drive controller is configured to control the operation of the optical system driver on the basis of the first correction amount, and is configured to control the operation of the imaging element driver on the basis of the second correction amount.

A camera according to a seventh aspect is the camera according to the third aspect, further comprising an imaging element configured to be driven by the rotary driver along with the displacement acquisition section, and configured to convert an optical image of the subject into an image signal, and an angle acquisition section configured to acquire the rotational angle of the housing. The drive controller is configured to control the operation of the rotary driver so that the imaging element is rotationally driven with respect to the housing on the basis of the rotational angle acquired by the angle acquisition section.

BRIEF DESCRIPTION OF THE DRAWINGS

Referring now to the attached drawings which form a part of this original disclosure:

FIGS. 7A and 7B are diagrams illustrating the amount of shake Δz2 when the rotational center Oc coincides with the center E of a lens 102;

FIG. 19A is a diagram of when the rotational center Oc is on the opposite side from the subject, with the acceleration sensor in between, and FIG. 19B is when the rotational center Oc is between the acceleration sensor and the subject;

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiments will now be described through reference to the drawings.

Overall Configuration of Camera

Figure 1:
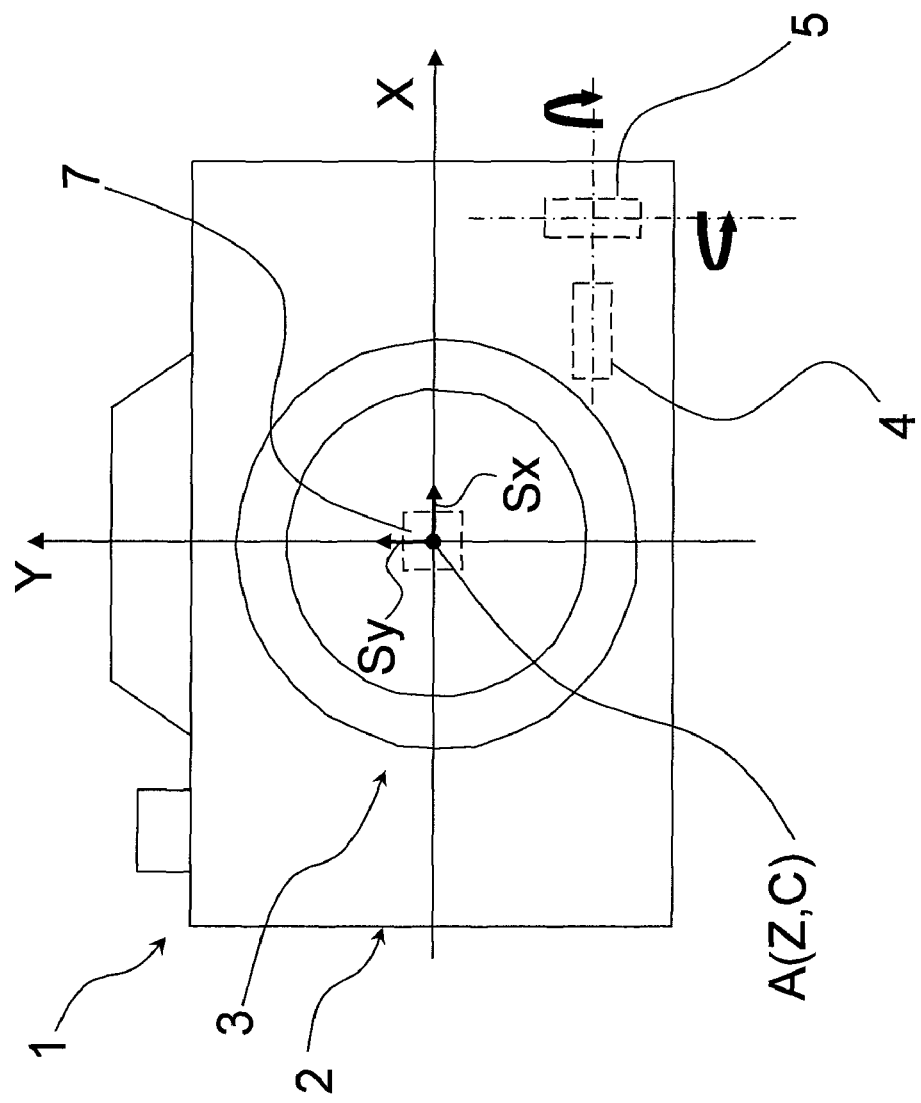
FIG. 1 is a front view of a camera.

The overall configuration of the camera 1 according to an embodiment will now be described through reference to FIGS. 1 to 3. FIG. 1 is a front view of a camera, FIG. 2 is a diagram of the internal configuration of the camera 1, and FIG. 3 is a block diagram of the camera 1.

Figure 2:
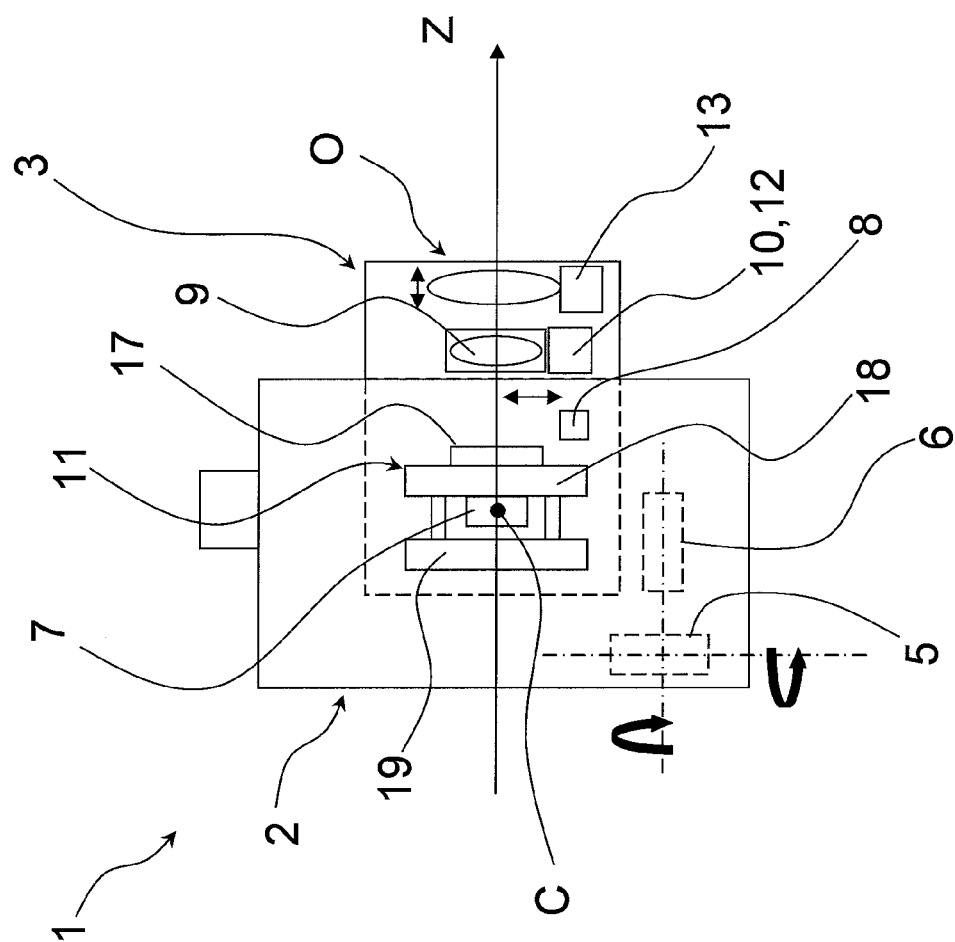
FIG. 2 is a simplified diagram of the camera configuration.
Figure 3:
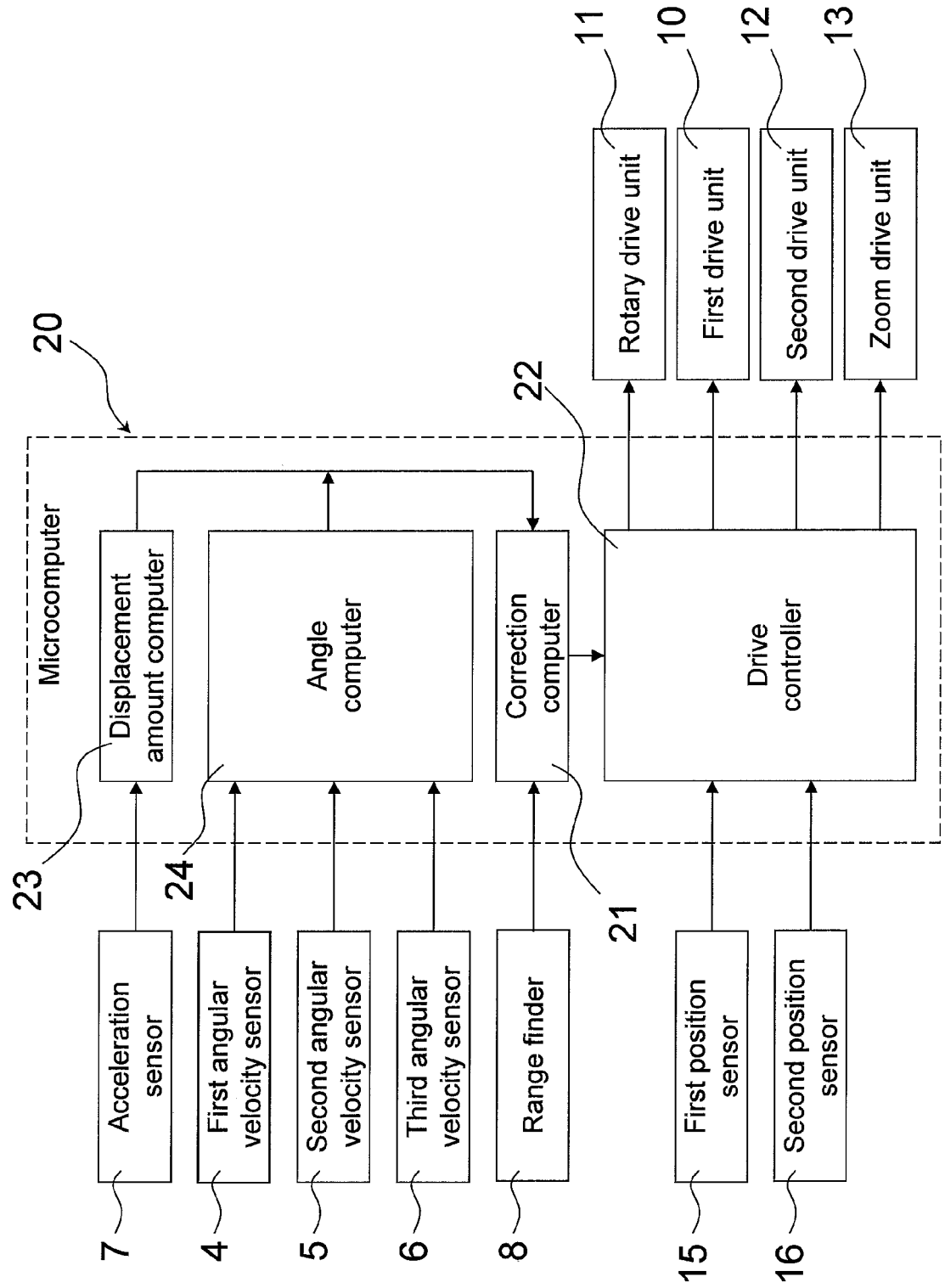
FIG. 3 is a block diagram of the camera.

As shown in FIGS. 1 and 2, the camera 1 has a housing 2, an optical system O for forming an optical image of a subject, a lens barrel 3 for supporting the optical system O, and an imaging element 17. The optical system O is, for example, a zoom optical system having a plurality of lens groups, and has an optical axis A. With the camera 1, a perpendicular coordinate system (X, Y, and Z) is set using the optical axis A as a reference. The Z axis coincides with the optical axis A, and the subject side of the camera 1 corresponds to the positive side in the Z axis direction. The lens groups of the optical system O are driven along the optical axis A by a zoom drive unit 13 via a plurality of lens frames included in the lens barrel 3. This allows the optical zoom ratio of the optical system O to be varied. The zoom drive unit 13 has a stepping motor, for example. The operation of the zoom drive unit 13 is controlled by a drive controller 22 of a microcomputer 20 (discussed below). The drive controller 22 counts the number of control pulses sent to the zoom drive unit 13, which allows the microcomputer 20 to ascertain the optical zoom ratio of the optical system O.

The camera 1 has a first angular velocity sensor 4 (an example of a first angle acquisition section) for detecting the angular velocity ωx of the housing 2 around the X axis, a second angular velocity sensor 5 (an example of an angle acquisition section) for detecting the angular velocity ωy of the housing 2 around the Y axis, a third angular velocity sensor 6 for detecting the angular velocity ωz of the housing 2 around the Z axis, and a range finder 8 (an example of a distance acquisition section).

The first to third angular velocity sensors 4 to 6 are gyro sensors, for example. The first to third angular velocity sensors 4 to 6 can detect the rotary motion (angular velocity) of the housing 2. The rotational angle can be acquired by subjecting the detected angular velocity to time integration. This computation is performed by an angle computer 24 of the microcomputer 20. That is, the first to third angular velocity sensors 4 to 6 and the angle computer 24 constitute an angle acquisition section with which the rotational angle of the camera 1 can be acquired.

The range finder 8 is an apparatus used to measure the distance to the subject by utilizing an infrared beam, a laser, or the like. The distance from the camera 1 to the subject can be measured by the range finder 8. More precisely, the range finder 8 can acquire the distance from the detection center C of an acceleration sensor 7 (discussed below) to the subject.

The camera 1 has an acceleration sensor 7 (an example of a displacement acquisition section) for detecting the acceleration to which the camera 1 is subjected, in addition to the first to third angular velocity sensors 4 to 6. The acceleration sensor 7 is, for example, a MEMS (micro-electro-mechanical system) type of biaxial acceleration sensor, and has two perpendicular sensitivity axes (a first sensitivity axis Sx and a second sensitivity axis Sy). In a state in which a rotary drive unit 11 is in its reference position (a state in which the imaging element 17 is not tilted with respect to the housing 2), the first and second sensitivity axes Sx and Sy are disposed substantially parallel to the X axis direction and the Y axis direction. The acceleration sensor 7 has a detection center C. The detection center C is an imaginary point that is the center in the detection of acceleration by the acceleration sensor 7, and substantially coincides with the intersection of the first and second sensitivity axes Sx and Sy. When viewed in the Z axis direction, the detection center C substantially coincides with the optical axis A and the Z axis. If the acceleration sensor 7 is rectangular when viewed along the optical axis A, the detection center C substantially coincides with the center of this rectangle, for example. Therefore, when viewed along the optical axis A, the acceleration sensor 7 overlaps the optical axis A.

When the acceleration detected by the acceleration sensor 7 has undergone time integration twice, the amount of displacement (amount of movement) of the camera 1 is obtained. This computation is performed by a displacement amount computer 23 (discussed below). This displacement amount is used in the computation of the drive amount by a correction computer 21. That is, the acceleration sensor 7 and the displacement amount computer 23 constitute a displacement acquisition section with which the amount of displacement of the camera 1 can be acquired.

The optical system O has a correcting lens 9 for correcting displacement of the optical image (hereinafter also referred to as image blur) with respect to the imaging element 17 caused by shaking of the housing 2. The correcting lens 9 is driven in a direction perpendicular to the optical axis A with respect to the housing 2 by a first drive unit 10 and a second drive unit 12. More precisely, the first drive unit 10 drives the correcting lens 9 in the Y axis direction (the pitch direction). The second drive unit 12 drives the correcting lens 9 in the X axis direction (the yaw direction). The position of the correcting lens 9 with respect to the lens barrel 3 or the optical axis A can be detected by a first position sensor 15 and a second position sensor 16. The first position sensor 15 detects the position of the correcting lens 9 in the X axis direction. The second position sensor 16 detects the position of the correcting lens 9 in the Y axis direction.

The camera 1 has a rotary drive unit 11 for rotationally driving the imaging element 17 around the optical axis A. The rotary drive unit 11 has a rotary plate 18 that rotates around the optical axis A, and an actuator 19 that rotationally drives the rotary plate 18. The rotational axis K of the rotary plate 18 substantially coincides with the optical axis A. The actuator 19 is a stepping motor, for example, and is directly or indirectly fixed to the housing 2. The operation of the rotary drive unit 11 is controlled by the drive controller 22. The microcomputer 20 can ascertain the rotational angle of the rotary plate 18 with respect to the housing 2 by counting the number of control pulses sent from the drive controller 22 to the actuator 19.

The imaging element 17 is provided on the Z axis direction positive side of the rotary plate 18, and the acceleration sensor 7 is provided on the Z axis direction negative side (the opposite side from the imaging element 17). Consequently, the imaging element 17 and the acceleration sensor 7 can be rotated by any angle around the optical axis A (around the Z axis) with respect to the housing 2. When viewed along the optical axis A, the center of the imaging element 17 and the detection center C of the acceleration sensor 7 substantially coincide with the rotational axis K of the rotary plate 18.

The camera 1 is controlled by the microcomputer 20. The microcomputer 20 has a CPU, ROM, and RAM, and can execute various functions by reading programs stored in the ROM into the CPU. For instance, the microcomputer 20 has a function of calculating the shake amount of the camera 1, or a function of calculating the drive amount of the correcting lens 9 from the rotational angle and the optical zoom ratio.

As shown in FIG. 3, the microcomputer 20 has the correction computer 21, the drive controller 22, the displacement amount computer 23, and the angle computer 24. The angle computer 24 calculates rotational angles $\theta x$, $\theta y$, and $\theta z$ by subjecting the angular velocities $\omega x$, $\omega y$, and $\omega z$ detected by the first to third angular velocity sensors 4 to 6 to time integration. The displacement amount computer 23 calculates the respective displacement amounts by performing time integration twice on accelerations $\Delta x$ and $\Delta y$, which are first and second sensitivity axes $Sx$ and $Sy$ detected by the acceleration sensor 7. The correction computer 21 calculates the drive amount $\Delta d$ of the correcting lens 9 on the basis of the rotational angle and displacement amount. The drive controller 22 controls the operation of the first drive unit 10, the second drive unit 12, and the rotary drive unit 11 on the basis of the drive amount $\Delta d$ calculated by the correction computer 21.

As discussed above, computation is performed by the microcomputer 20 based on the detection results of the various sensors, and image blur can be corrected according to the movement of the camera 1. That is, the correcting lens 9, the first drive unit 10, the second drive unit 12, the imaging element 17, and the rotary drive unit 11 constitute an image blur corrector that corrects image blur. Also, the correcting lens 9, the first drive unit 10, and the second drive unit 12 constitute a first corrector that uses a correction optical system to perform image blur correction.

Effect that Position of Rotational Center has on Shake Amount

Figure 4:
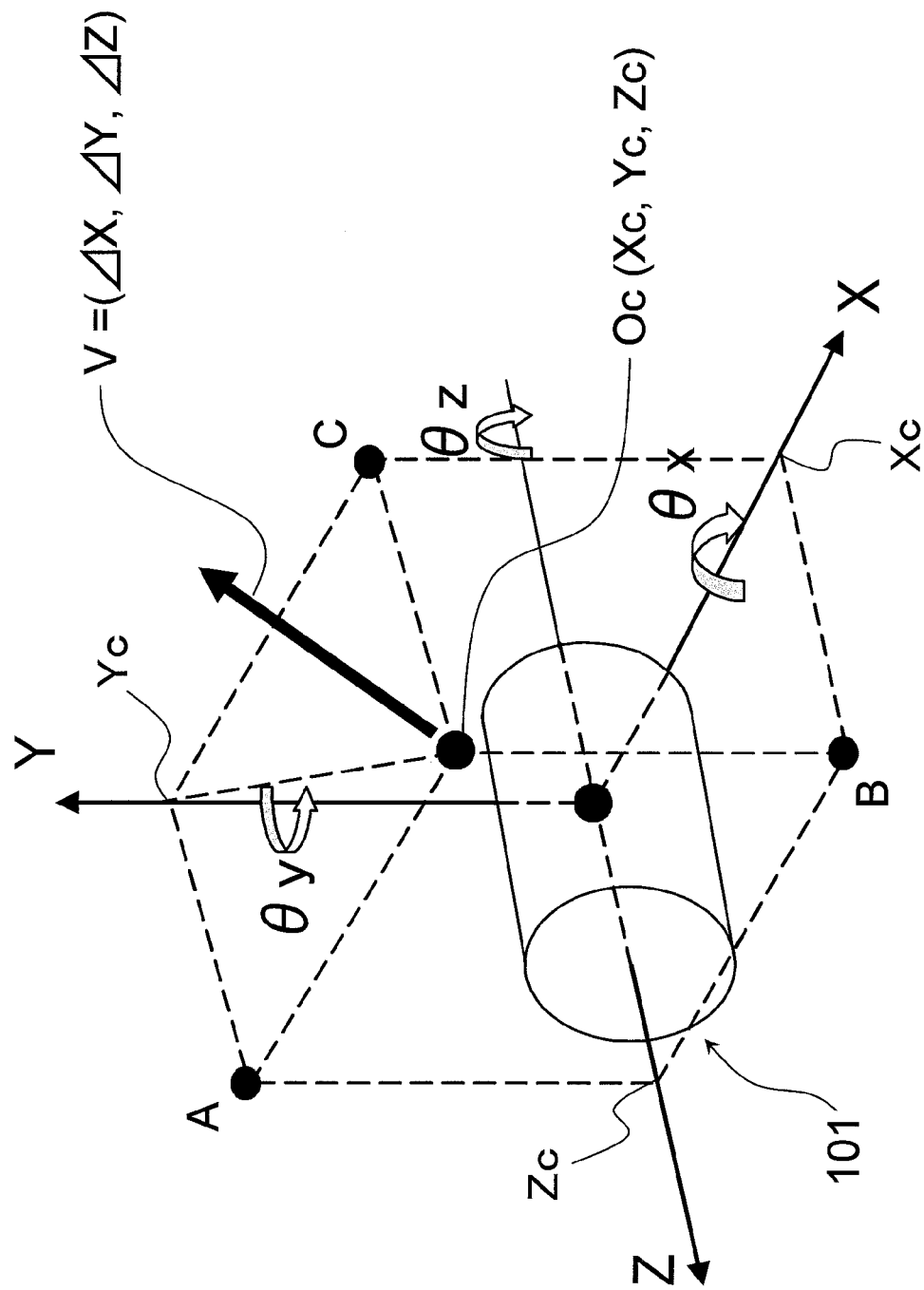
FIG. 4 is a diagram of the camera coordinates.

A camera 101 will be used as an example to describe the effect that the position of the rotational center of rotational shake of the camera has on the amount of camera shake and the amount of image blur. FIG. 4 shows the coordinate system of the camera 101. As shown in FIG. 4, a perpendicular coordinate system (X, Y, and Z) is set using the optical axis A of the optical system O as a reference. The Z axis coincides with the optical axis A.

Two kinds of shake are possible in the camera 101 during imaging: rotational shake and translational shake. Rotational shake refers to shaking of the camera 101 caused by rotation of the camera 101 around a point present in the coordinate system. Translational shake refers to shaking of the camera 101 caused by movement of the camera 101 with respect to the coordinate system in a state in which there is no change in the angle (orientation) of the camera 101 with respect to the coordinate system. Usually, the shaking of the camera 1 is a combination of these two kinds of shake.

We will let the rotational center of rotational shake of the camera 101 be Oc (Xc, Yc, Zc), the rotational angle of rotational shake around the X axis be the angle $\theta x$ (pitch component), the rotational angle around the Y axis be the angle $\theta y$ (yaw component), and the rotational angle around the Z axis be the angle $\theta z$ (roll component). We will let the X axis component of the translational shake V of the camera 101 be $\Delta X$, the Y axis component be $\Delta Y$, and the Z axis component be $\Delta Z$.

(1) The Effect that the Rotational Angle $\theta x$ has on the Shake Amount

Figure 5:
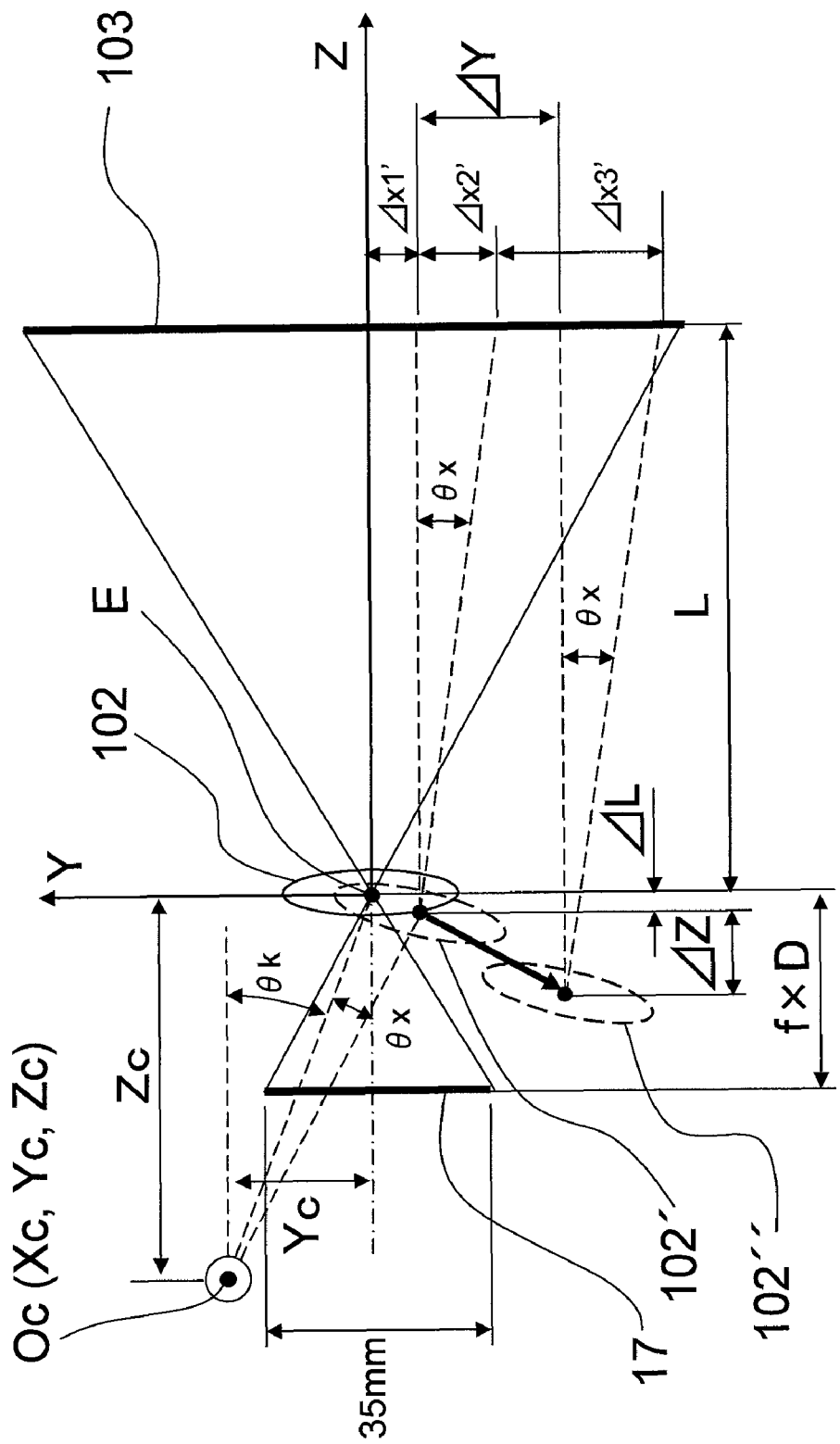
FIG. 5 is a schematic of the effect that the rotational angle θx has on the amount of shake.

FIG. 5 is a schematic of the effect that the rotational angle $\theta x$ has on the amount of shake. In FIG. 5, for the sake of convenience, the optical system O is substituted with a single lens 102. We will let L be the distance (imaging distance) from the lens 102 to a subject 103 in a state in which no shake of the camera 101 is occurring, and let f×D be the distance from the lens 102 to the imaging element 17 in a state in which no shake of the camera 101 is occurring. Here, f is the focal length (such as 35 mm), and D is the optical zoom ratio.

In FIG. 5, if we assume that the lens 102 has moved to a position 102' after rotating by the angle $\theta x$ around the point Oc (Xc, Yc, Zc), then the shake amount $\Delta bx'$ of the camera 101 when viewed in the X axis direction is expressed by the following equation.

[Mathematical Formula 1]

$$\Delta bx' = \Delta x1' + \Delta x2'$$

Here, the shake amount $\Delta x2'$ is the rotational component of the shake amount of the camera 101 when the center E of the lens 102 is used as a reference, and the shake amount $\Delta x1'$ is the translational component of the shake amount of the camera 101 caused by offset of the center E of the lens 102 and the rotational center Oc. To make it easier to see the difference between the shake amounts $\Delta x1$ and $\Delta x2$ (discussed below), $\Delta x1'$ and $\Delta x2'$ are used here as the shake amounts.

When geometrically calculated, the shake amounts $\Delta x1'$, $\Delta L$, and $\Delta x2'$ are expressed by the following equations.

When $Zc=0$,

[Mathematical Formula 2]

$$\Delta x1' = Yc - Yc \times \cos \theta x$$

[Mathematical Formula 3]

$$\Delta L = Yc \times \sin \theta x$$

When $Zc \neq 0$,

[Mathematical Formula 4]

$$\Delta x1' = \sqrt{Yc^2 + Zc^2} \times \sin(\theta x + \theta k) - Yc$$

[Mathematical Formula 5]

$$\Delta L = Zc - \sqrt{Yc^2 + Zc^2} \times \cos(\theta x + \theta k)$$

[Mathematical Formula 6]

$$\Delta x2' = (L + \Delta L) \times \tan \theta x$$

Furthermore, if we assume that a lens 102' has moved to a position 102" due to translational shake V ($\Delta X$, $\Delta Y$, $\Delta Z$), then the translational shake amount $\Delta x3'$ is expressed by the following equation.

[Mathematical Formula 7]

$$\Delta x3' = \Delta Y + \Delta Z \times \tan \theta x$$

Because of the above, the shake amount $\Delta bx'$ is expressed by the following equation.

[Mathematical Formula 8]

$$\Delta bx' = \Delta x1' + \Delta Y + (L + \Delta L + \Delta Z) \times \tan \theta x$$

(2) The Effect that the Rotational Angle θy has on the Shake Amount

Figure 6:
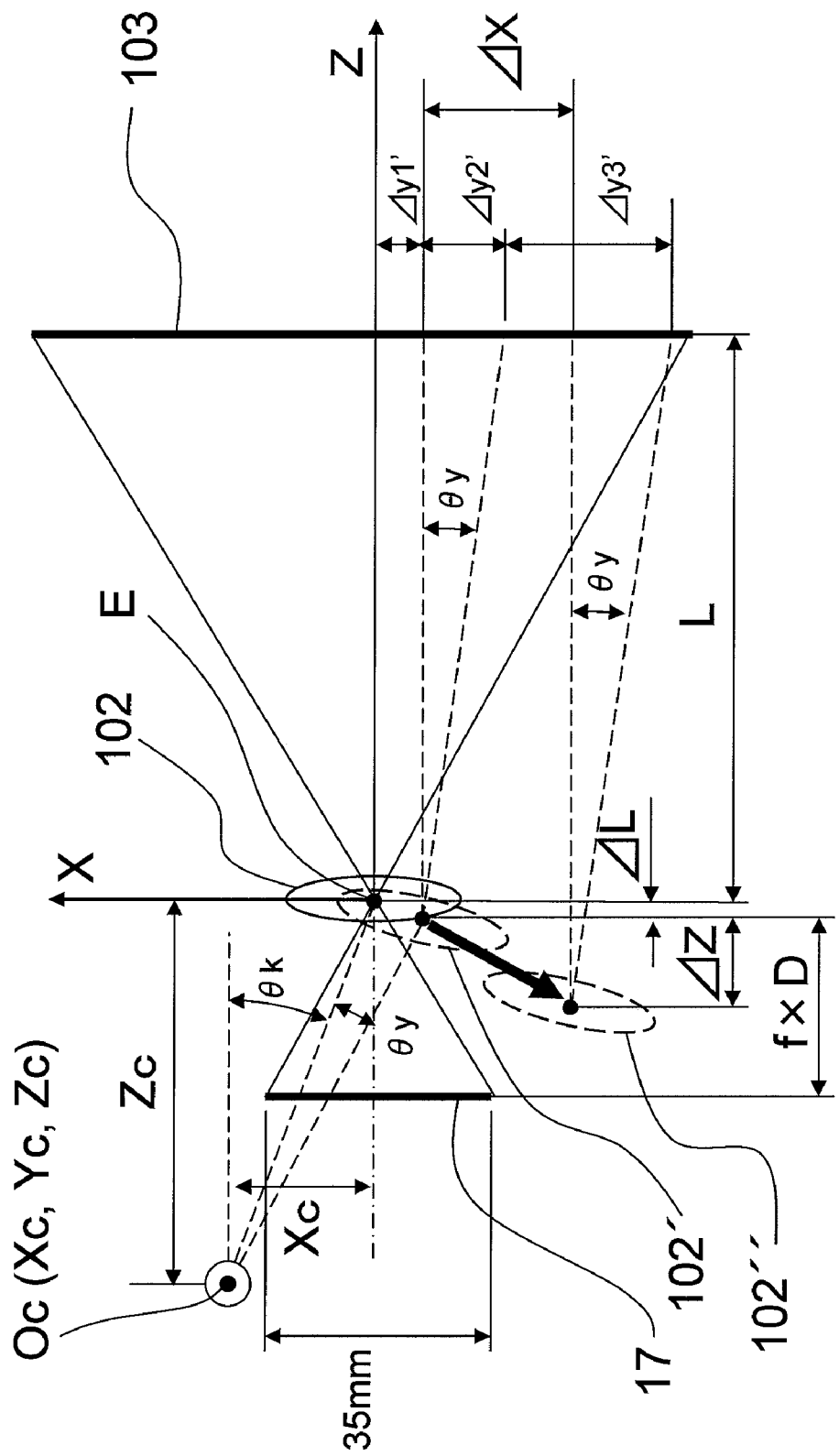
FIG. 6 is a schematic of the effect that the rotational angle θy has on the amount of shake.

FIG. 6 is a schematic of the effect that the rotational angle θy has on the amount of shake. In FIG. 6, just as with FIG. 5, the optical system O is substituted with a single lens 102, and we will let L be the distance (imaging distance) from the lens 102 to the subject 103 in a state in which no shake of the camera 101 is occurring, and let f×D be the distance from the lens 102 to the imaging element 17 in a state in which no shake of the camera 101 is occurring. Here, f is the focal length (such as 35 mm), and D is the optical zoom ratio.

In FIG. 6, when the camera 101 has rotated by the angle θy around the rotational center Oc (Xc, Yc, Zc), and as a result the lens 102 has moved to the position 102', then the shake amount Δby' of the camera 101 when viewed in the Y axis direction is expressed by the following equation.

[Mathematical Formula 9]

$$\Delta by' = \Delta y1' + \Delta y2'$$

Here, the shake amount Δy2' is the rotational component of the shake amount of the camera 101 when the center E of the lens 102 is used as a reference, and the shake amount Δy1' is the translational component of the shake amount of the camera 101 caused by offset of the center E of the lens 102 and the rotational center Oc. To make it easier to see the difference between the shake amounts Δy1 and Δy2 (discussed below), Δy1' and Δy2' are used here as the shake amounts.

When geometrically calculated, the shake amounts Δy1', ΔL, and Δy2' are expressed by the following equations.

When Zc=0,
[Mathematical Formula 10]

$$\Delta y1' = Xc - Xc \times \cos\theta y$$

[Mathematical Formula 11]

$$\Delta L = Xc \times \sin\theta y$$

When Zc≠0,
[Mathematical Formula 12]

$$\Delta y1' = \sqrt{Xc^2 + Zc^2} \times \sin(\theta y + \theta k) - Xc$$

[Mathematical Formula 13]

$$\Delta L = Zc - \sqrt{Xc^2 + Zc^2} \times \cos(\theta y + \theta k)$$

[Mathematical Formula 14]

$$\Delta y2' = (L + \Delta L) \times \tan\theta y$$

Furthermore, if we assume that a lens 102' has moved to a position 102" due to translational shake V (ΔX, ΔY, ΔZ) of the camera 101, then the translational shake amount Δy3' is expressed by the following equation.

[Mathematical Formula 15]

$$\Delta y3' = \Delta X + \Delta Z \times \tan\theta y$$

Because of the above, the shake amount Δby' is expressed by the following equation.

[Mathematical Formula 16]

$$\Delta by' = \Delta y1' + \Delta X + (L + \Delta L + \Delta Z) \times \tan\theta y$$

(3) Shake Amount when Viewed in the Z Axis Direction

Figure 8:
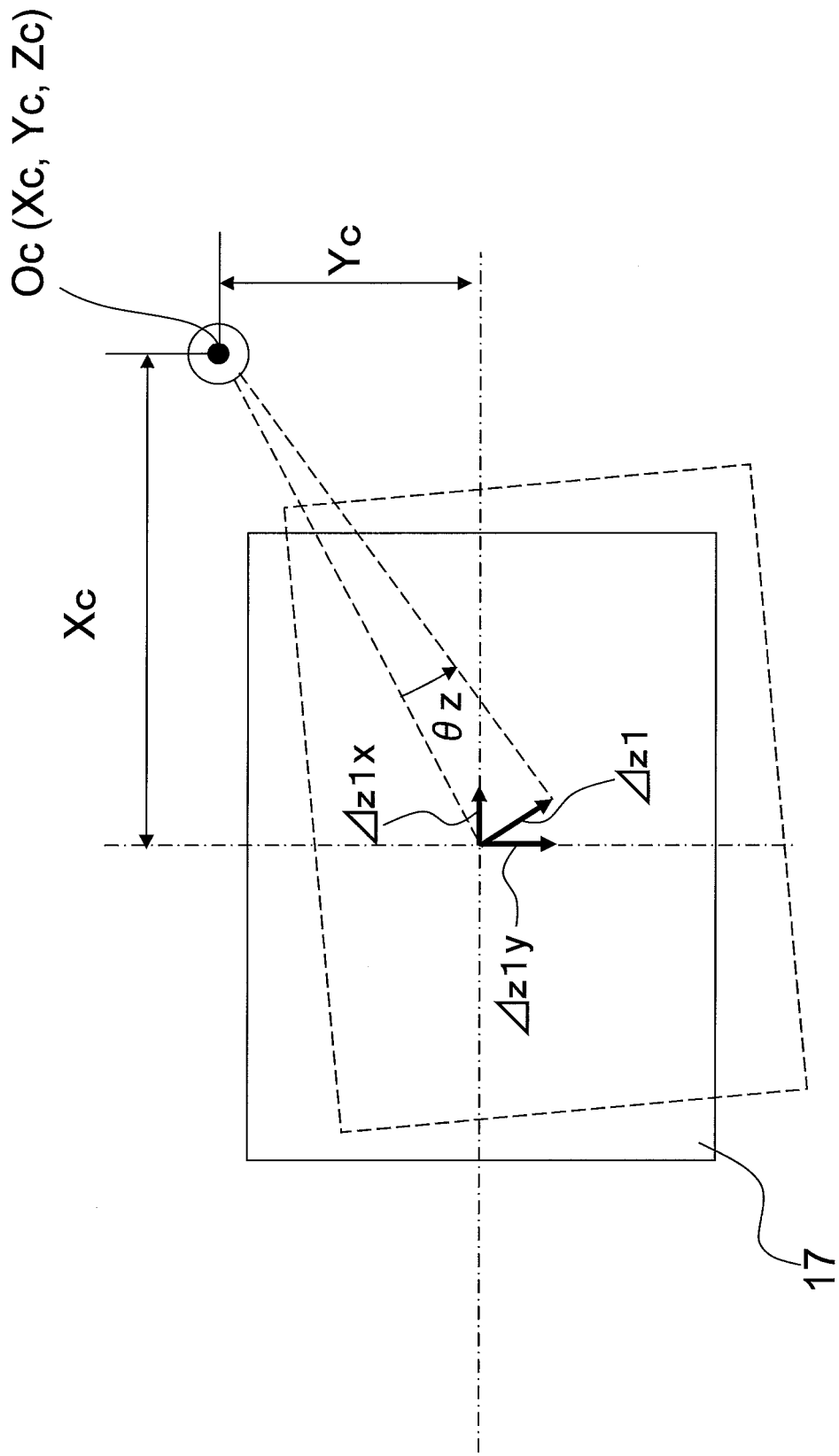
FIG. 8 is a diagram illustrating the amount of shake Δz1 when the rotational center Oc is offset from the center E of the lens 102.

FIGS. 7A and 7B are diagrams illustrating the amount of shake Δz2 of the camera 101 when the rotational center Oc coincides with the center E of the lens 102. FIG. 8 is a diagram illustrating the amount of shake Δz' when the rotational center Oc is offset from the center E of the lens 102. As shown in FIGS. 7A and 7B, when the rotational center Oc coincides with the center E of the lens 102, the lens 102 rotates by the angle θz around the optical axis A. In this case, the lateral width W of the subject 103 is expressed by the following equation.

[Mathematical Formula 17]

$$W = 35 \times L/(f \times D)$$

Therefore, if we let Wx be the lateral width of the imaging element 17, and Wy be the longitudinal width of the imaging element 17, the shake amount Δz2 is expressed by the following equation.

[Mathematical Formula 18]

$$\Delta z2 = 35/(Wx \times f \times D) \times \sqrt{Wx^2 + Wy^2} \times \sin(\theta z/2)$$

In FIG. 8, if the rotational center Oc is offset from the center E, the lens 102 rotates by the angle θz around the rotational center Oc (Xc, Yc, Zc). Therefore, the shake amount Δz' caused by offset of the center E and the rotational center Oc is expressed by the following equation.

[Mathematical Formula 19]

$$\Delta z1 = \sqrt{Xc^2 Yc^2} \times \tan\theta z$$

Therefore, the shake amount Δbz when viewed in the Z axis direction is expressed by the following equation.

[Mathematical Formula 20]

$$\Delta bz = \Delta z1 + \Delta z2$$

(4) Shake Amount Calculation Results

When it is calculated, on the basis of the above relation, who the pitch component Δbx', the yaw component Δby', and the roll component Δbz of the shake amount of the camera 101 (more precisely, the pitch, yaw, and roll components of the amount of displacement of an optical image with respect to the imaging element 17 calculated on the basis of the pitch component Δbx', the yaw component Δby', and the roll component Δbz) are affected by the optical zoom ratio D and the imaging distance L, the following results are obtained. In this calculation, it was assumed that the focal length f was 28 mm when the optical zoom ratio D=1, the optical zoom ratio D was 1 to 10 times, and the imaging element 17 was a CCD with 7,200,000 pixels and a 1/2.5 format.

As discussed above, regarding the rotational shake of the camera 1, it has been confirmed experimentally that the angles θx, θy, and θz are about the same, and this has been discussed, for example, "3D Measurement and Quantification of Hand Shake" published in IEICE Technical Report PRMU2006-202 (2007-1). The fact that the maximum rotational angle of rotational shake is about 0.5° has also been confirmed experimentally in the past. Therefore, we will assume the rotational angles here to be θx=θy=θz=0.5°.

Figure 9:
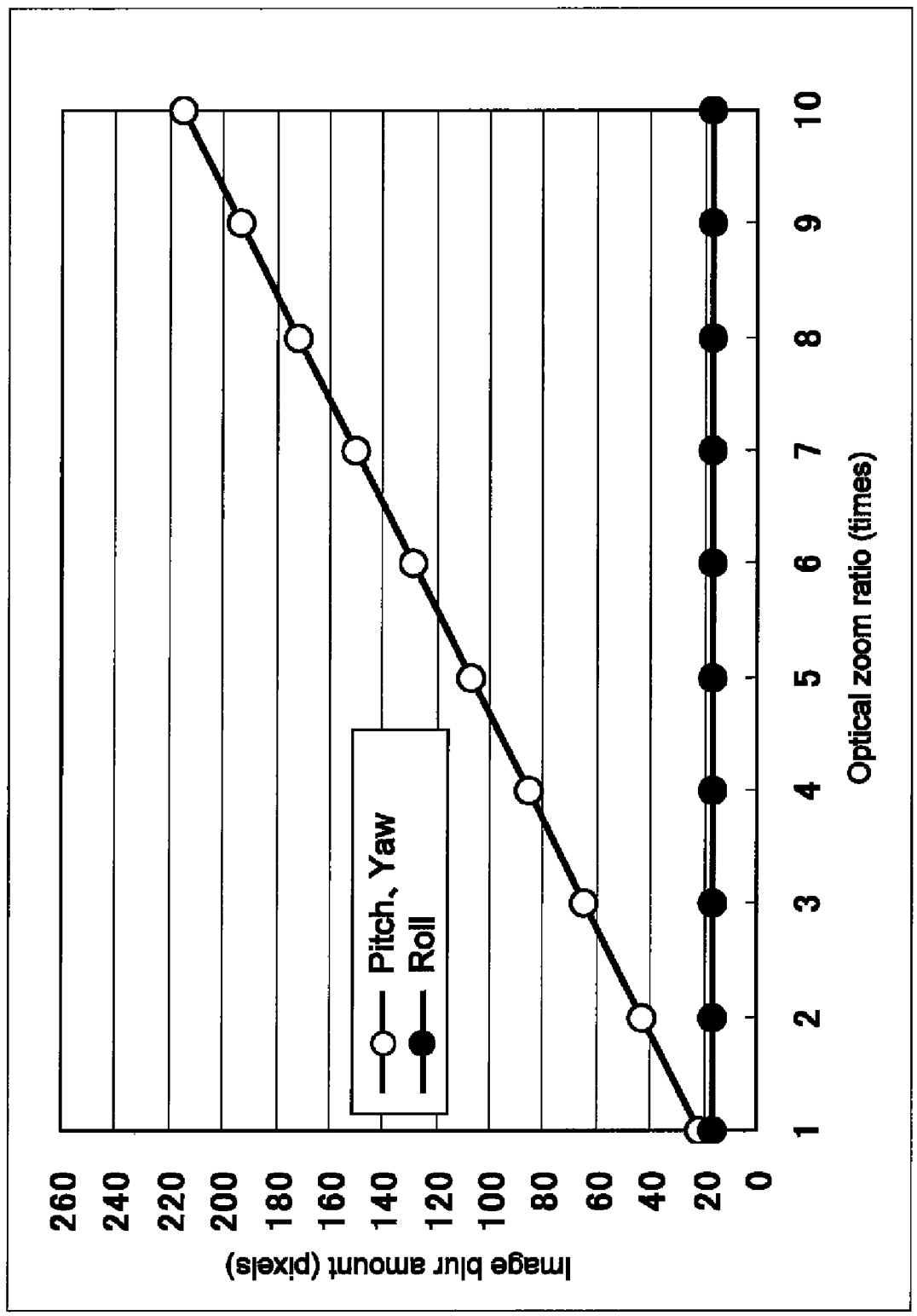
FIG. 9 is a graph of the results of calculating the pitch, yaw, and roll components of the amount of shake.

FIG. 9 is a graph of the results of calculating the pitch, yaw, and roll components of the amount of shake when the rotational center Oc coincides with the center E of the lens 102 and there is no translational shake of the camera 101. That is, FIG. 9 shows the results of calculating when Xc=Yc=Zc 32 0. The amount of image blur referred to here is the amount of displacement of an optical image with respect to the imaging element 17 caused by shaking of the camera 101. The pitch, yaw, and roll components of the amount of image blur are calculated on the basis of the above-mentioned pitch component Δbx', yaw component Δby', and roll component Δbz, and are each expressed as a pixel count. It can be seen from FIG. 9 that the pitch, yaw, and roll components of the amount of image blur are about the same when the optical zoom ratio D is low, but as the optical zoom ratio D rises, the pitch, yaw, and roll components of the amount of image blur increase.

Figure 10:
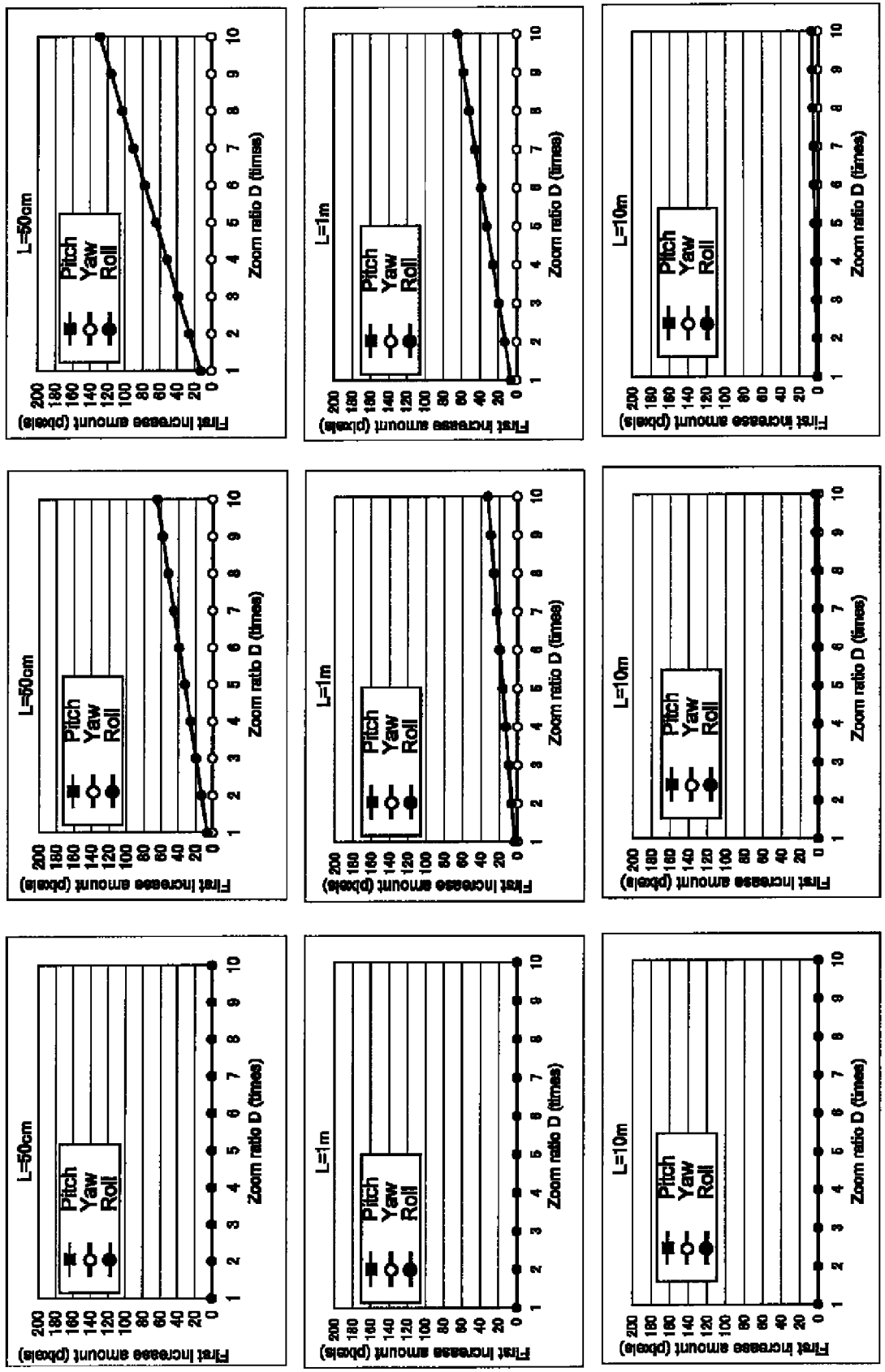
FIGS. 10A to 10C are graphs of a first increase amount and the X axis component Xc of the rotational center Oc.
Figure 11:
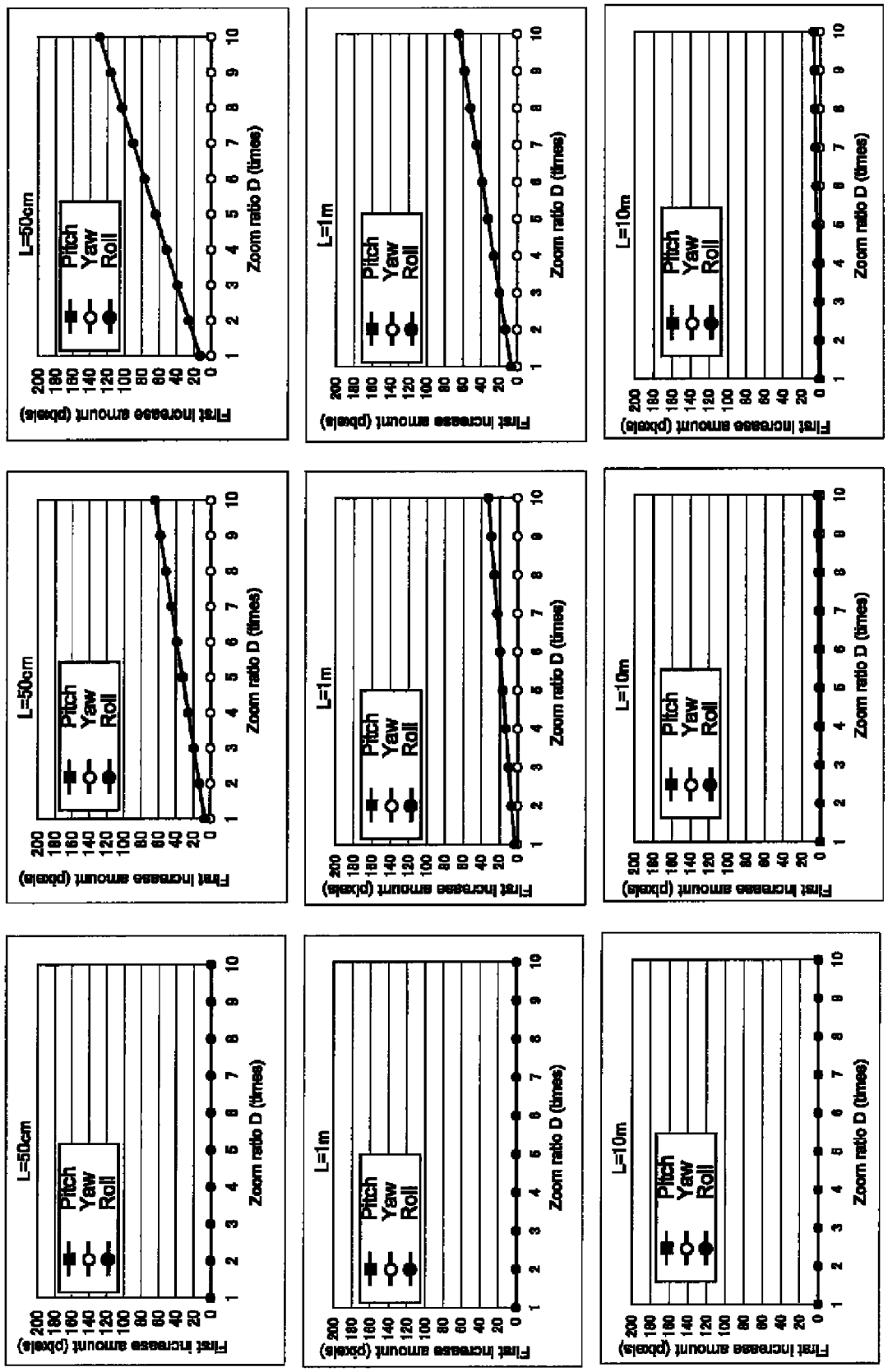
FIGS. 11A to 11C are graphs of a first increase amount and the Y axis component Yc of the rotational center Oc.
Figure 12:
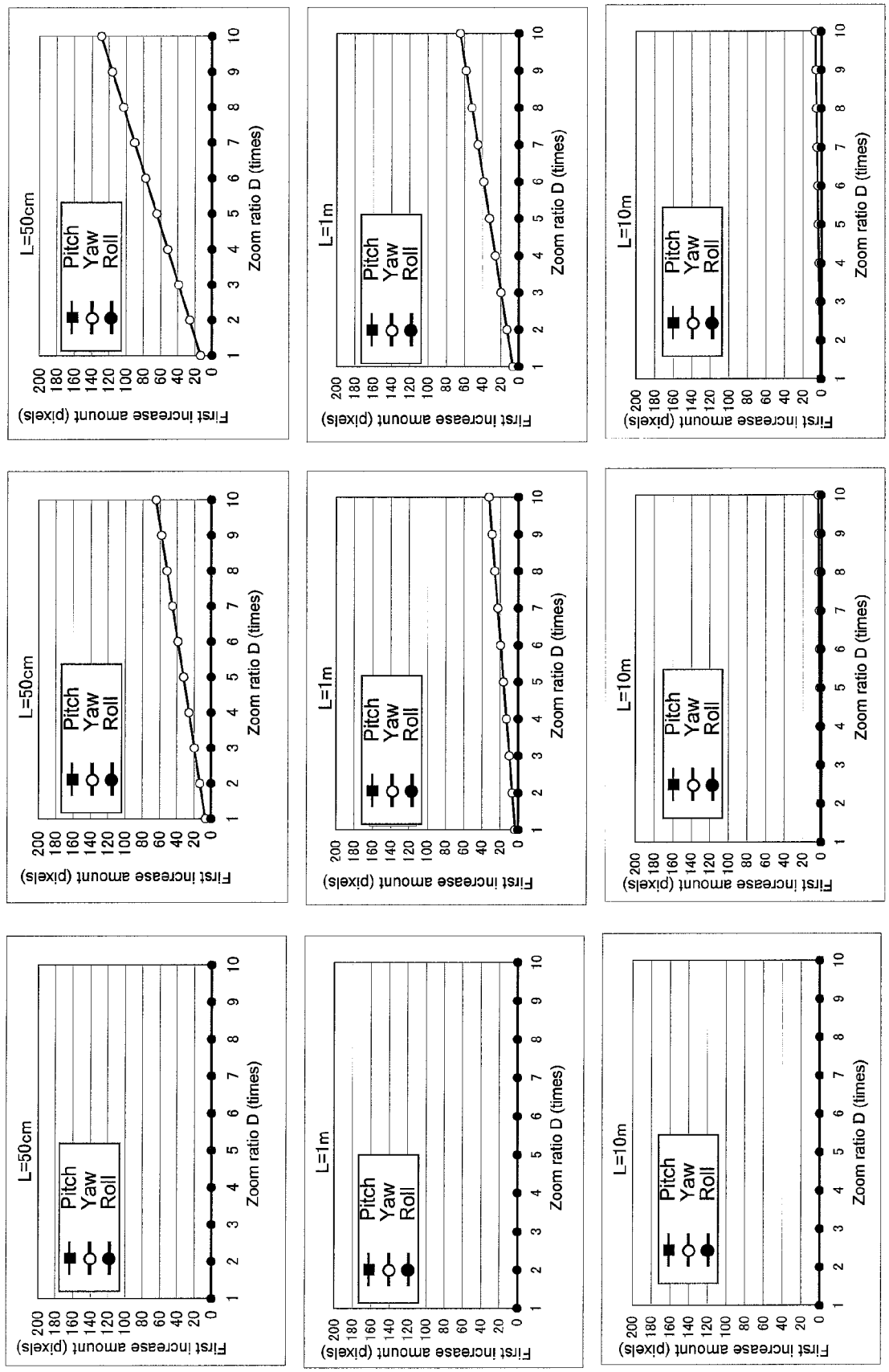
FIGS. 12A to 12C are graphs of a first increase amount and the Z axis component Zc of the rotational center Oc.

Next, a case in which the rotational center Oc is offset from the center E of the lens 102 will be described. FIGS. 10A to 10C are graphs of the relation between a first increase amount and the X axis component Xc of the rotational center Oc, FIGS. 11A to 11C are graphs of the relation between a first increase amount and the Y axis component Yc of the rotational center Oc, and FIGS. 12A to 12C are graphs of the relation between a first increase amount and the Z axis component Zc of the rotational center Oc. The first increase referred to here is the amount of image blur that is increased by offset of the rotational center Oc from the center E of the lens 102, and is the amount of image blur corresponding to the above-mentioned shake amounts Δx1' and Δy1'.

In the graphs, the horizontal axis is the optical zoom ratio D, and the vertical axis is the first increase amount. Also, the top graph in each drawing shows the imaging distance L=50 cm, the middle graph shows the imaging distance L=1 m, and the bottom graph shows the imaging distance L=10 m. Calculations are made for three different situations, when the distances Xc, Yc, and Zc from the rotational center Oc to the center E of the lens 102 are (A) 0 mm, (B) 150 mm, and (C) 300 mm, respectively. The joints of the user are usually the rotational center in actual imaging. For instance, when a point that is away from the camera, such as an elbow or a shoulder, is the rotational center, the distance from the center E of the lens 102 to the rotational center Oc is about 300 mm.

It can be seen from FIGS. 10A to 12C that when the optical zoom ratio D is high and the imaging distance L is short, offset between the rotational center Oc and the center E of the lens 102 have a greater effect on the amount of image blur. If we take into consideration the fact that shaking of the camera 101 results in very noticeable degradation of the image when the actual amount of image blur is 10 (pixels) or greater, offset between the rotational center Oc and the center E of the lens 102 can no longer be ignored above this level. The offset amount Xc between the rotational center Oc and the center E of the lens 102 in the X axis direction has a particularly great effect on the roll component of the image blur amount, and the offset amount Yc between the rotational center Oc and the center E of the lens 102 in the Y axis direction also greatly affects the roll component of the image blur amount. Further, the offset amount Zc between the rotational center Oc and the center E of the lens 102 in the Z axis direction greatly affects both the pitch component and the yaw component of the image blur amount. In these graphs, the calculation results for the pitch component may look like they are not displayed, but since the calculation results for the pitch component are the same as the calculation results for the yaw component, the pitch component results are merely superposed with the yaw component results.

Effect that Translational Shake of the Camera has on Blur Amount

Figure 13:
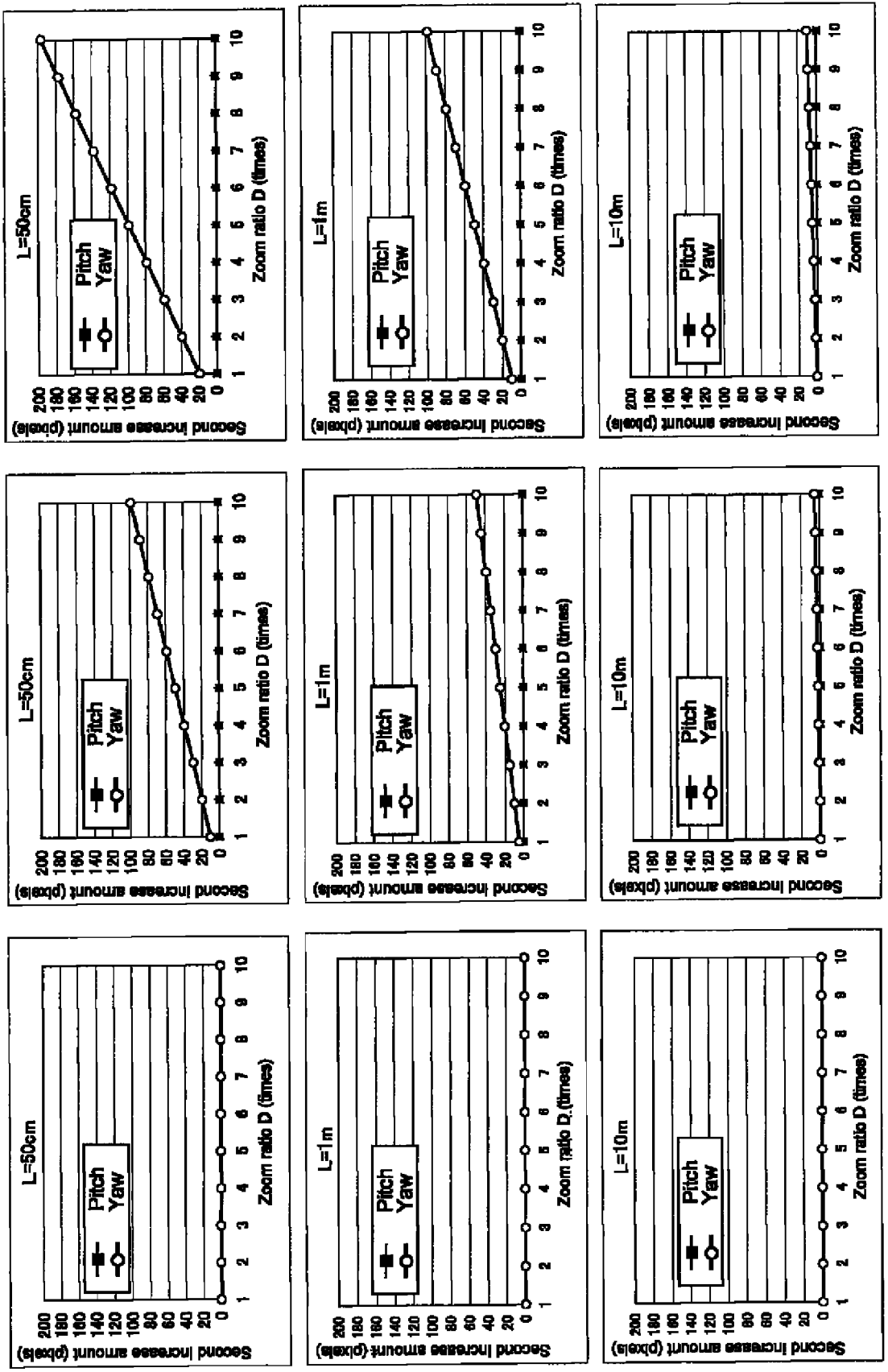
FIGS. 13A to 13C are graphs of a second increase amount and the translational shake amount ΔX of the camera in the X axis direction.
Figure 14:
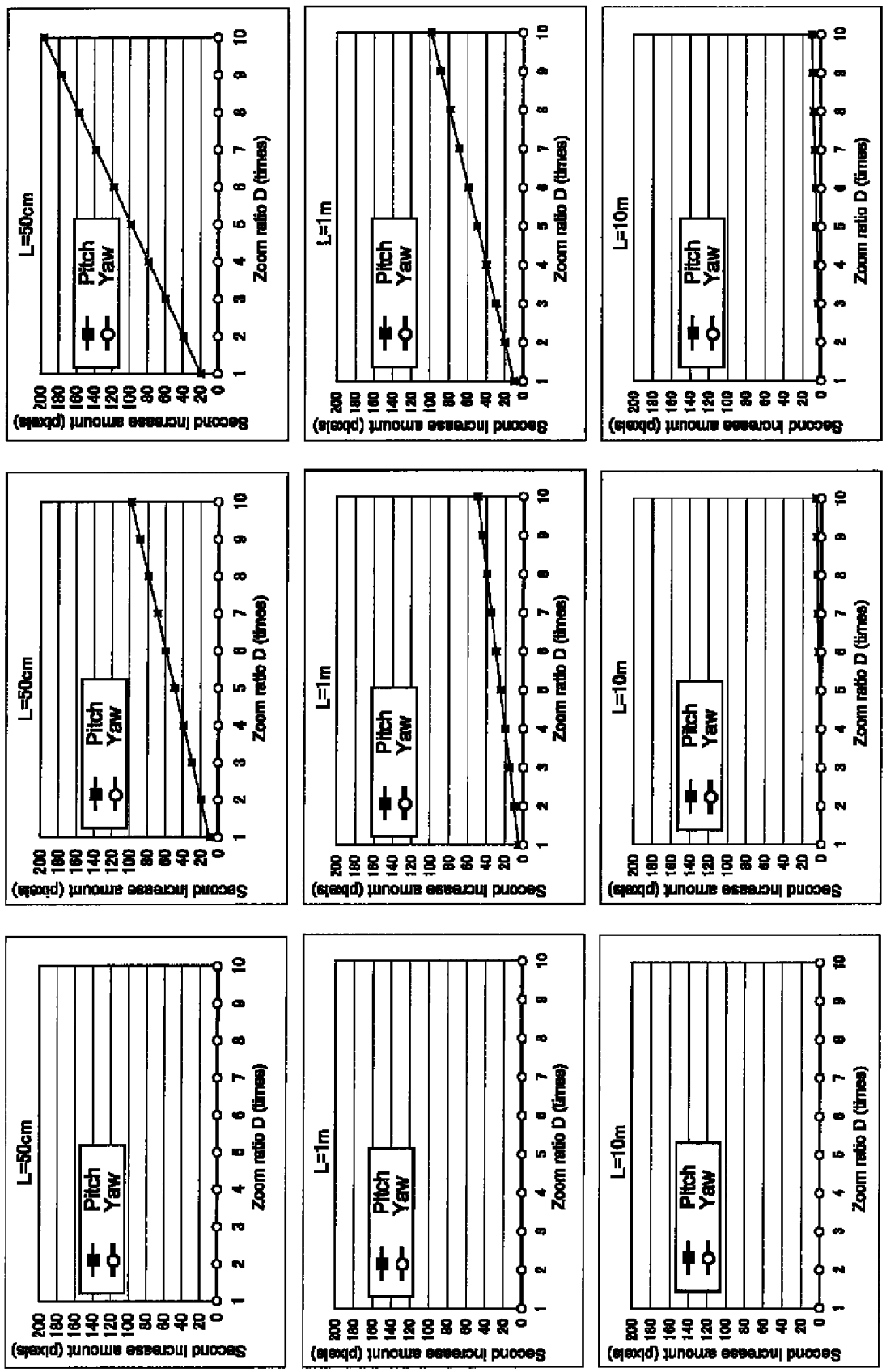
FIGS. 14A to 14C are graphs of a second increase amount and the translational shake amount ΔY of the camera in the Y axis direction.
Figure 15:
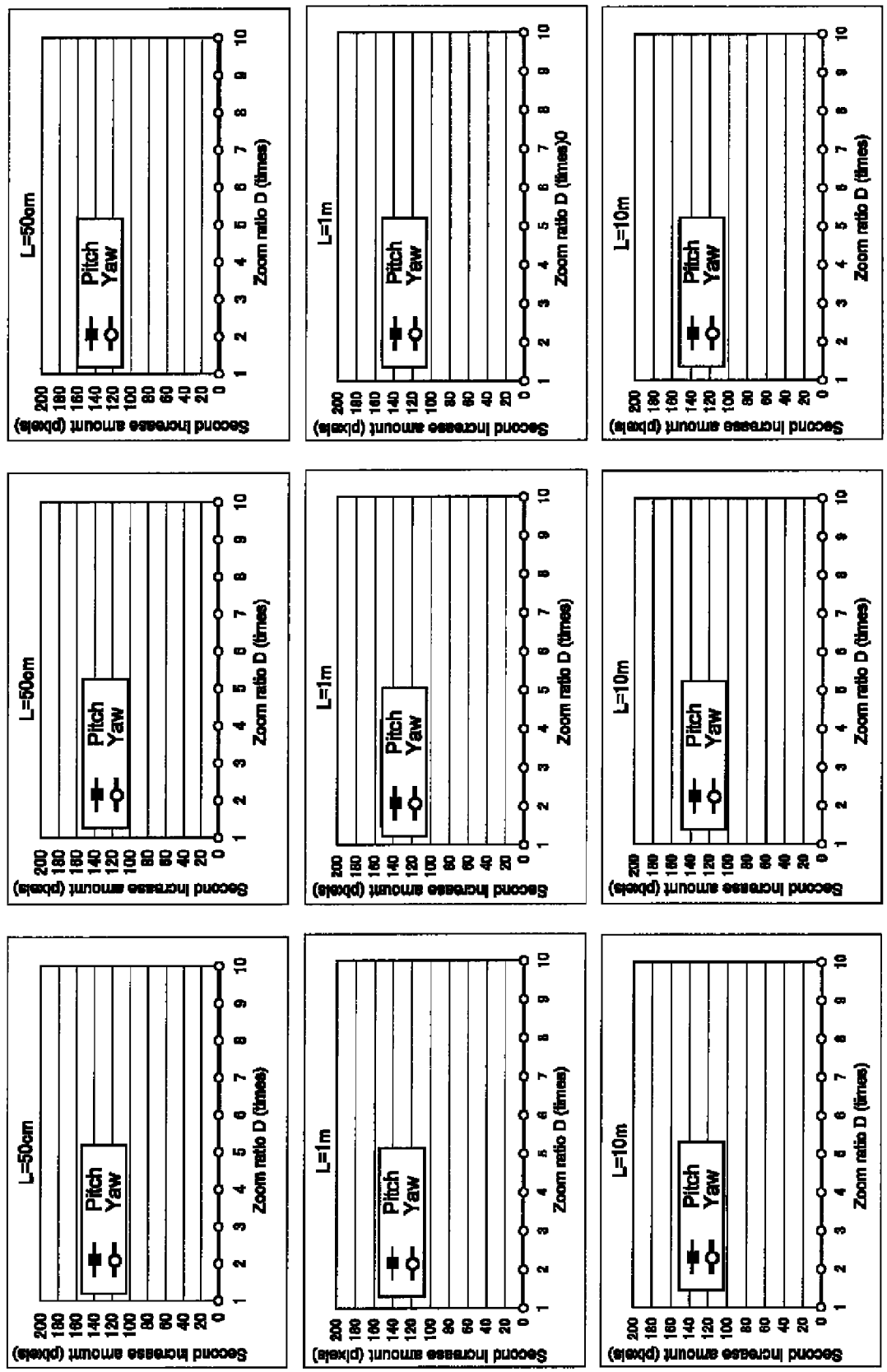
FIGS. 15A to 15C are graphs of a second increase amount and the translational shake amount ΔZ of the camera in the Z axis direction.

Next, we will describe the effect that translational shake of the camera 101 has on the amount of image blur. FIGS. 13A to 13C are graphs of the relation between a second increase amount and the translational shake amount ΔX of the camera 101 in the X axis direction, FIGS. 14A to 14C are graphs of the relation between the second increase amount and the translational shake amount ΔY of the camera 101 in the Y axis direction, and FIGS. 15A to 15C are graphs of the relation between the second increase amount and the translational shake amount ΔZ of the camera 101 in the Z axis direction. In FIGS. 13A to 15C, the horizontal axis is the optical zoom ratio D, and the vertical axis is the second increase amount. The second increase referred to here is the amount of image blur corresponding to translational shake, and is the amount of image blur corresponding to the above-mentioned shake amounts Δx3' and Δy3'.

In FIGS. 13A to 15C, the top graph in each drawing shows the imaging distance L=50 cm, the middle graph shows the imaging distance L=1 m, and the bottom graph shows the imaging distance L=10 m. Calculations are made for three different situations, when the translational shake amounts ΔX, ΔY, and ΔZ are (A) 0 mm, (B) 2 mm, and (C) 4 mm, respectively.

It can be seen from FIGS. 13A to 15C that in regard to the translational shake amounts ΔX and ΔY, when the optical zoom ratio D is high and the imaging distance L is short, translational shake of the camera 101 greatly affects the amount of image blur. More specifically, the yaw component of the second increase amount grows with the translational shake amount ΔX, and the pitch component of the second increase amount grows with the translational shake amount ΔY. The translational shake amount ΔZ in the Z axis direction, however, hardly affects the amount of image blur, so the translational shake amount ΔZ may safely be ignored.

As discussed above, the position of the rotational center Oc greatly affects the amount of image blur, and thus cannot be ignored. Accordingly, to further improve image blur correction performance, the shake amount or image blur amount must be calculated by taking into account the fact that the rotational center Oc can be in any of various positions.

Image Blur Correction Taking into Account Rotational Center and Translation

As discussed above, camera shake can be divided into two types: rotational shake and translational shake. To improve the image blur correction effect, in regard to the rotational shake of the camera, the amount of offset between the rotational center Oc and a reference point must be taken into consideration.

However, finding the position of the rotational center Oc is difficult in actual practice, and the amount of camera shake cannot be calculated by the above calculation method.

In view of this, with the camera 1, classification is performed as follows, and computation for image blur correction is performed.

Just as with the schematic diagram shown in FIG. 4, with this camera 1 a perpendicular coordinate system (X, Y, and Z) is set in which the optical axis A of the optical system O is the Z axis. The rotational angles when the rotational center at which rotational shake is generated in the camera 1 is broken down into Oc (Xc, Yc, Zc) and the rotational shake into the perpendicular coordinate system (X, Y, Z) shall be termed θx (pitch component), θy (yaw component), and θz (roll component). We will let the translational shake component of the camera 1 be V=(ΔX, ΔY, ΔZ).

Here, the angle θx indicates the rotational angle of the camera 1 around the X axis, and includes information related to the positive and negative directions around the X axis. The angle θy indicates the rotational angle of the camera 1 around the Y axis, and includes information related to the positive and negative directions around the Y axis. The angle θz indicates the rotational angle of the camera 1 around the Z axis, and includes information related to the positive and negative directions around the Z axis. The shake amounts ΔX, ΔY, and ΔZ indicate the amounts of translational shake of the camera in the X, Y, and Z axis directions, and include information related to the positive and negative directions in the above-mentioned coordinate system.

The rotational angles θx, θy, and θz can be calculated by subjecting the angular velocities ωx, ωy, and ωz detected by the first to third angular velocity sensors 4 to 6 to time integration.

The methods for calculating the amounts of rotational shake and translational shake will now be described.

Rotational Shake (1) Amount of Shake when Viewed in the X Axis Direction

Figure 16:
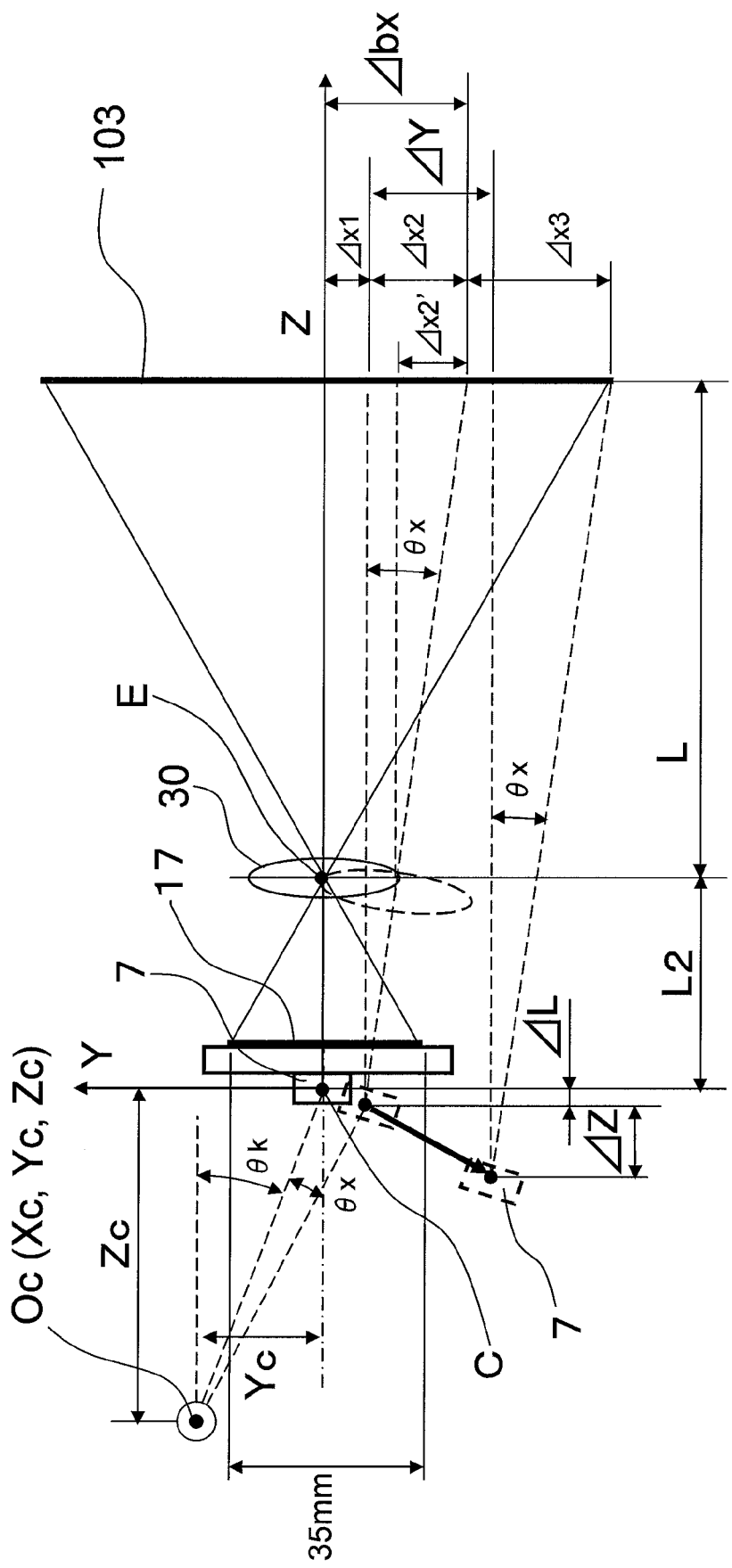
FIG. 16 is a diagram illustrating the shake amount when viewed in the X axis direction.

The correction of image blur caused by rotational shake with an angle of θx (pitch component) will be described. FIG. 16 is a diagram illustrating when the rotational center of the rotational shake of the camera 1 is Oc (Xc, Yc, Zc), and the rotational shake angle of the camera 1 is θx (pitch component).

With the above-mentioned method for calculating the shake amount, the rotational shake component Δx2' is calculated using the center E of the lens 102 as a reference.

However, finding the position of the rotational center Oc using the center E of the lens 102 as a reference is difficult in actual practice, and the rotational shake component Δx2' cannot be found.

In view of this, with this camera 1, the rotational shake component Δx2 is calculated using the detection center C of the acceleration sensor 7 as a reference in order to take the position of the rotational center Oc into account in the computation. The method for calculating the rotational shake component Δx2 using the detection center C of the acceleration sensor 7 as a reference will now be described.

As shown in FIG. 16, when the rotational center Oc (Xc, Yc, Zc) is rotated by the angle θx and the acceleration sensor 7 is moved to the position 7', the shake amount Δbx is expressed by the following equation.

[Mathematical Formula 21]

$$\Delta bx = \Delta x1 + \Delta x2$$

Here, the shake amount Δx2 is the rotational component of the shake amount of the camera 1 when the detection center C of the acceleration sensor 7 is used as a reference, and the shake amount Δx1 is the translational component of the shake amount of the camera 1 when the rotational center Oc and the detection center C of the acceleration sensor 7 are used as a reference. For the sake of convenience here, the optical system O will be substituted with a single lens 30. The shake amounts Δx1 and Δx2 indicate the shake amounts of the camera 1 in the Y axis direction, and include information related to the positive and negative directions.

Just as with the above-mentioned shake amount Δx2', the shake amount Δx2 is expressed by the following formula.

[Mathematical Formula 22]

$$\Delta x2 = (L + L2 + \Delta L) \times \tan \theta x$$

In this case, the distance L2 from the lens 30 to the acceleration sensor 7 is also taken into account in addition to the distance L from the center E of the lens 30 to the subject 103, so the shake amount Δx2 is greater than the shake amount Δx2' by L2×tan θx (as compared to the above-mentioned Formula 6). The distance L here can be found with the range finder 8, for example. The distance L2 is a value determined at the design stage, and is preset in the microcomputer 20.

Also, since the shake amount Δx2 is calculating using the detection center C of the acceleration sensor 7, rather than the center E of the lens 30, as a reference, the shake amount Δx1 coincides with the amount of displacement of the acceleration sensor 7 in the Y axis direction, as shown in FIG. 16. The amount of displacement of the acceleration sensor 7 is obtained by subjecting the acceleration Δy in the Y axis direction detected by the acceleration sensor 7 to time integration twice. More specifically, the shake amount Δx1 is expressed by the following equation.

[Mathematical Formula 23]

$$\Delta y' = \int (\int Aydt)dt$$

The time t here is a predetermined unit time, such as the unit detection time of the acceleration sensor 7.

The shake amount Δbx that takes into account the position of the rotational center Oc (more precisely, the shake amounts Δx1 and Δx2) can be calculated by a simple method, without finding the rotational center Oc directly, by using the detection center C of the acceleration sensor 7 as a reference. More specifically, an accurate shake amount Δx1 can be calculated from the acceleration Δy in the Y axis direction obtained by the acceleration sensor 7, and an accurate rotational angle θx can be found from the angular velocity ωx around the X axis obtained by the first angular velocity sensor 4.

Figure 17:
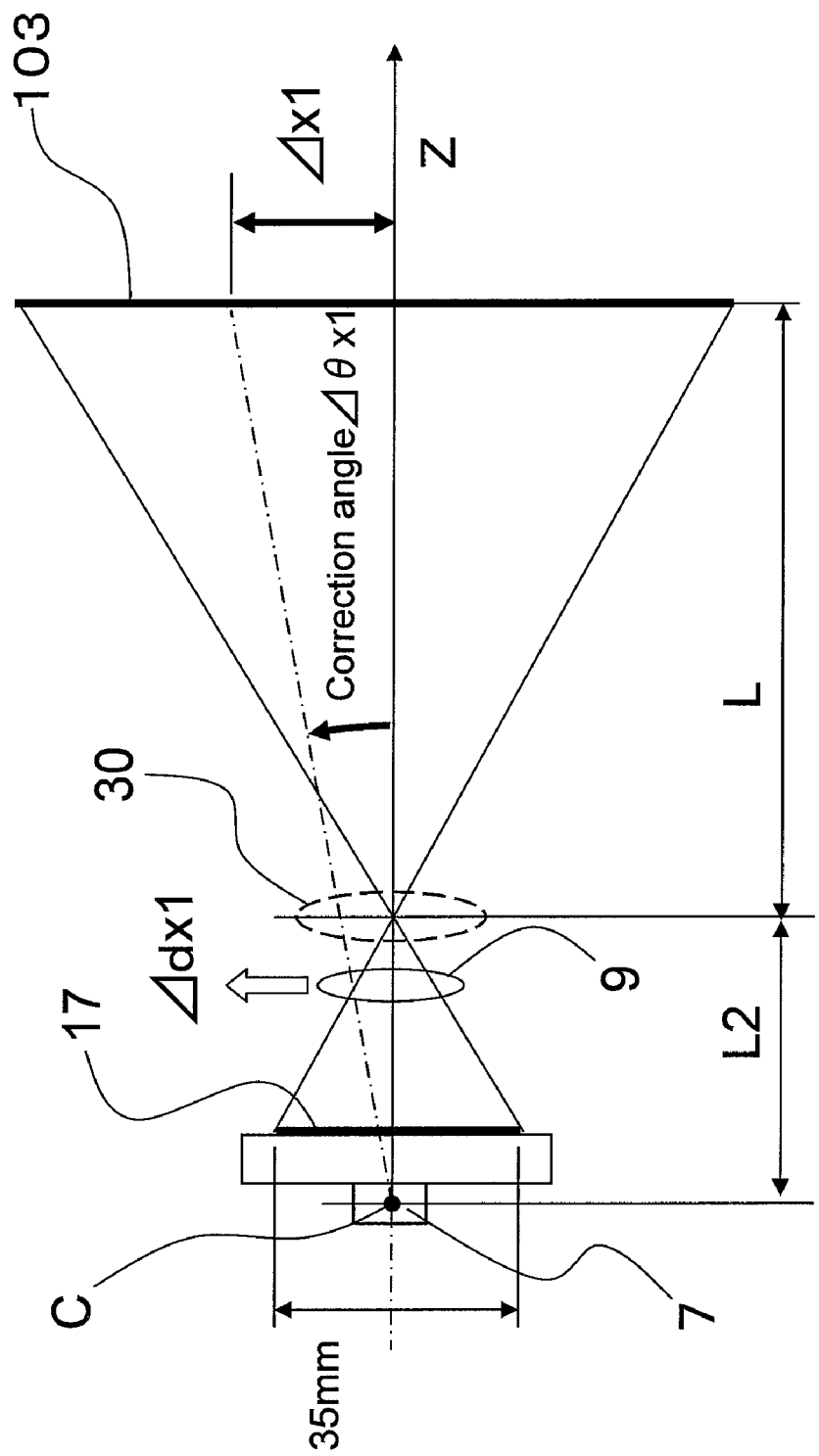
FIG. 17 is a diagram of the relation between the correction angle and the drive amount of the correcting lens.

The method for correcting image blur caused by the shake amount Δb will now be described briefly. Image blur is corrected by driving the correcting lens 9 in the X axis direction or Y axis direction (in this case, the Y axis direction) according to the various shake amounts. The relation between the correction angle Δθ and the drive amount Δd of the correcting lens 9 here varies with the optical zoom ratio. The "correction angle Δθ" is the angle calculated from the imaging distance and the shake amount Δb. In this case, as shown in FIG. 17, the correction angle Δθ is determined using the detection center C of the acceleration sensor 7, rather than the center E of the lens 30, as a reference. The distance from the acceleration sensor 7 (more precisely, the detection center C of the acceleration sensor 7) to the subject is used for the distance to the subject in the calculation of the drive amount Δd. The relation between the correction angle Δθ and the drive amount Δd of the correcting lens 9 calculated ahead of time under this condition is indicated by the data in FIG. 18, for example.

Figure 18:
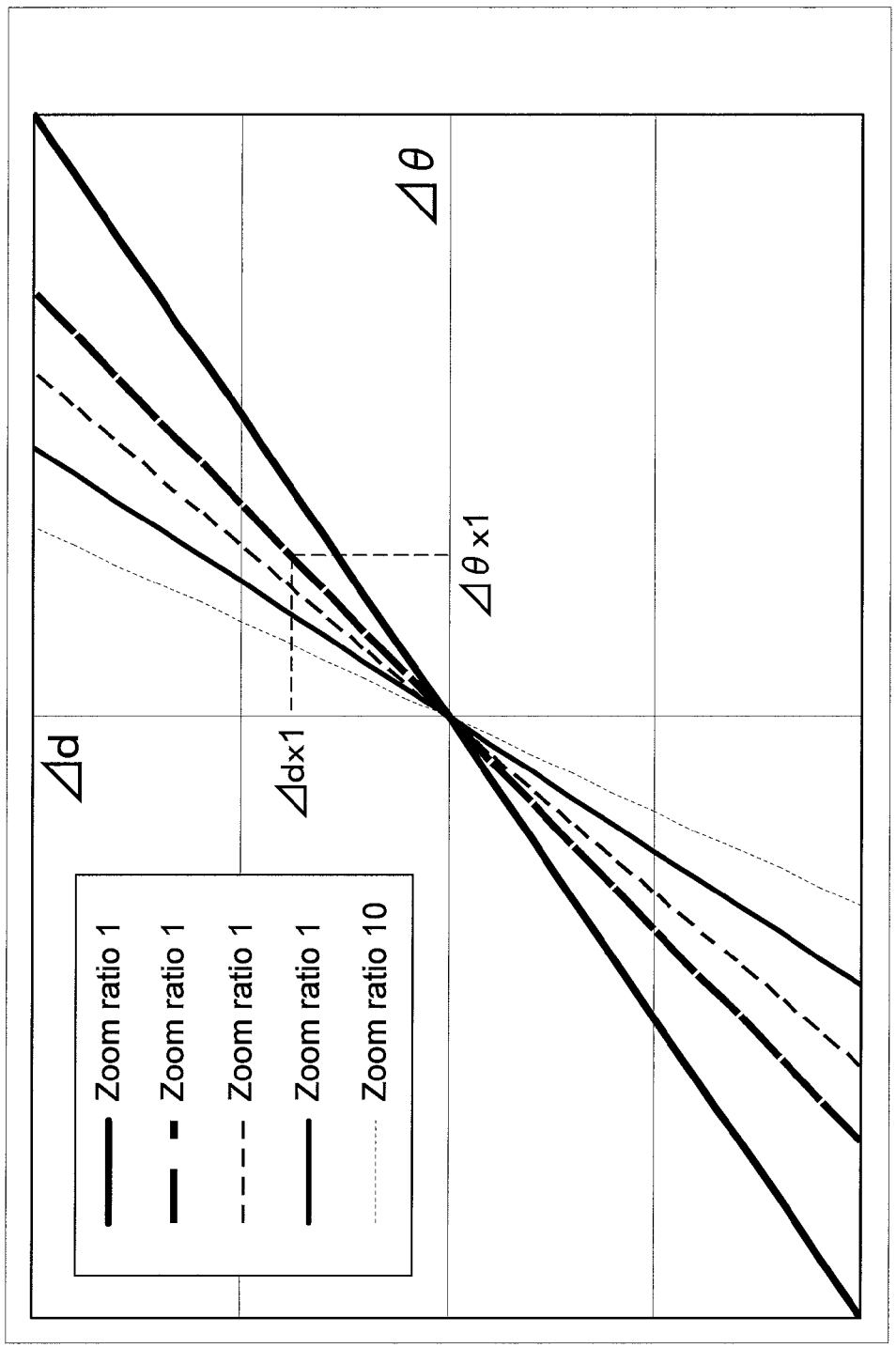
FIG. 18 is a graph of the relation between the correction angle and the drive amount at various optical zoom ratios.

In FIG. 18, horizontal axis is the drive amount Δd of the correcting lens 9, and the vertical axis is the correction angle Δθ. Since the relation between the drive amount Δd and the correction angle Δθ varies with the optical system, it must be ascertained for each optical system. Therefore, the data shown in FIG. 18 is stored ahead of time in the ROM of the microcomputer 20, and this data can be used to find the drive amount Δd from the calculated shake amount and the optical zoom ratio. As can be seen in FIG. 18, the relation between the drive amount Δd of the correcting lens 9 and the correction angle Δθ varies with the optical zoom ratio. The relation shown in FIG. 18 is the same for both the correction angle around the X axis (pitch direction) and the correction angle around the Y axis (yaw direction).

Based on FIG. 17, the correction angle 0x1 corresponding to the shake amount Δx1 is expressed by the following equation.

[Mathematical Formula 24]

$$\Delta x1 = \tan^{-1}(\Delta x1/(L+L2))$$

Thus, the correction angle 0x1 can be found from the shake amount Δx1, and therefore the actual drive amount Δdx1 of the correcting lens 9 can be found. In addition to this, the drive amount Δdx2 for correcting the image blur caused by the shake amount Δx2 can be calculated from the graph in FIG. 18 and from the rotational angle θx corresponding to the shake amount Δx2. The drive amount Δdx obtained by summing the drive amounts Δdx1 and Δdx2 becomes the final drive amount Δdx of the correcting lens 9. When the correcting lens 9 is driven in the Y axis direction by this drive amount Δdx, image blur caused by the shake amounts Δx1 and Δx2 can be corrected.

In FIG. 16, the rotational center Oc (Xc, Yc, Zc) is to the rear of the acceleration sensor 7 (on the opposite side from the subject 103), but image blur can be corrected by the same method as described above when the rotational center Oc (Xc, Yc, Zc) is in front of the acceleration sensor 7 (on the subject 103 side). This is because, as discussed above, the shake amounts Δx1 and Δx2 and the angles θx, θy, and θz include information related to the positive and negative directions. Therefore, as shown in FIG. 19A, for example, the shake amount Δbx can be calculated from Formula 21 both when the rotational center Oc is on the opposite side from the subject 103 with the acceleration sensor 7 in between, or as shown in FIG. 19B, when the rotational center Oc is between the acceleration sensor 7 and the subject 103.

(2) Shake Amount when Viewed in the Y Axis Direction

Figure 20:
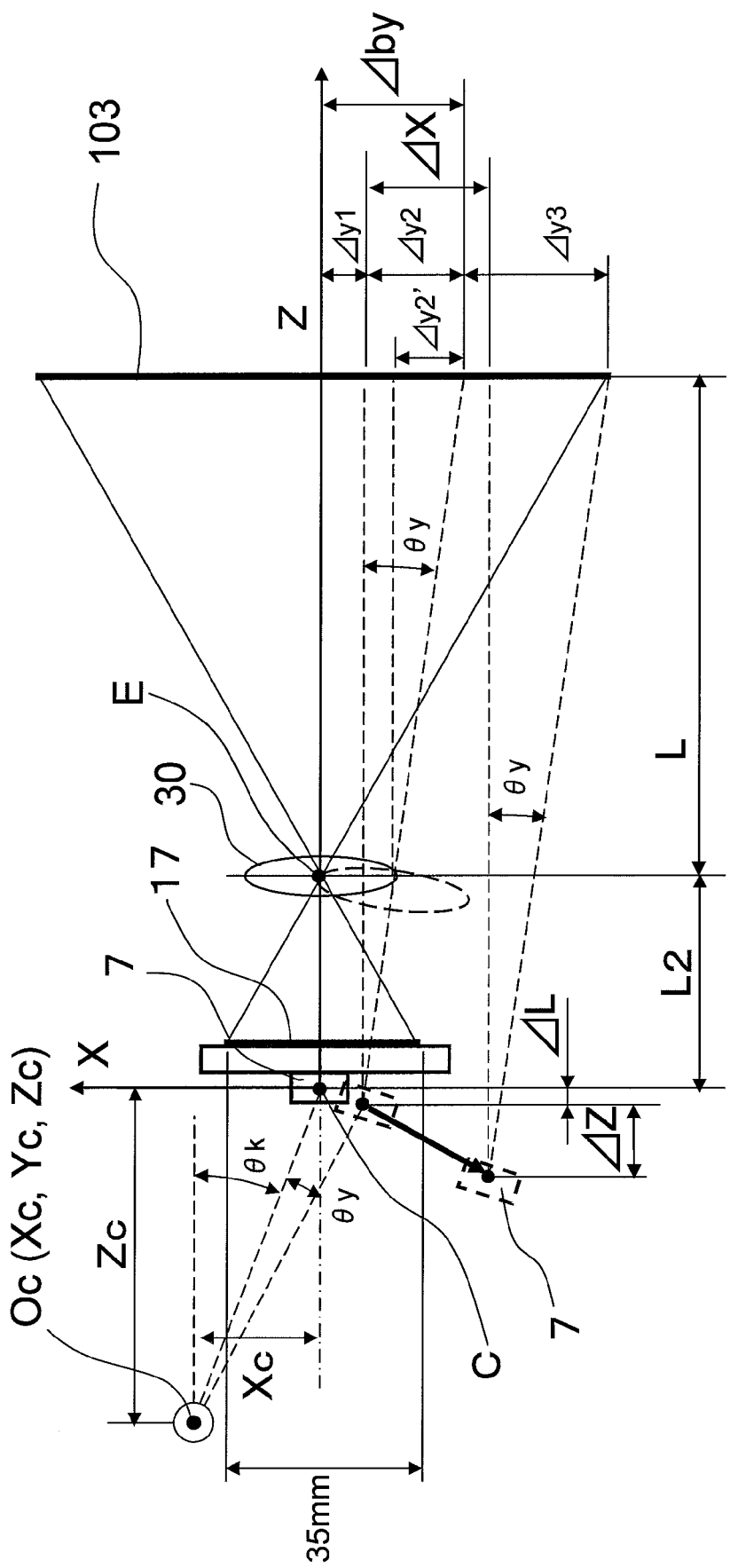
FIG. 20 is a diagram illustrating the shake amount when viewed in the Y axis direction.

Next, the correction of image blur caused by rotational shake with an angle of θy (yaw component) will be described. FIG. 20 is a diagram illustrating when the rotational center at which the rotational shake of the camera 1 is generated is Oc (Xc, Yc, Zc), and the rotational shake angle of the camera 1 is θy (yaw component).

Here, just as with the angle θx discussed above, the rotational shake component Δy2 is calculated using the detection center C of the acceleration sensor 7 as a reference.

In FIG. 20, if we assume that the rotational center Oc has been rotated by the angle θy around the center, and as a result the acceleration sensor 7 moved to the position 7', the shake amount Δby is expressed by the following equation.

[Mathematical Formula 25]

$$\Delta by = \Delta y1 + \Delta y2$$

Here, the shake amount Δy2 is the rotational component of the shake amount when the detection center C of the acceleration sensor 7 is used as a reference, and the shake amount Δy1 is the rotational component of the shake amount of the camera 1 caused by offset of the rotational center Oc and the detection center C of the acceleration sensor 7. The shake amounts Δy1 and Δy2 indicate shake amounts in the X axis direction, and include information related to the positive and negative directions.

Just as with the above-mentioned shake amount Δy2', the shake amount Δy2 is expressed by the following formula.

[Mathematical Formula 26]

$$\Delta y2 = (L + L2 + \Delta L) \times \tan\theta y$$

In this case, the distance L2 from the lens 30 to the acceleration sensor 7 is also taken into account in addition to the distance L from the center E of the lens 30 to the subject 103, so the shake amount Δy2 is greater than the shake amount Δy2' by L2×tan θy (as compared to the above-mentioned Formula 14).

Also, since the shake amount Δy2 is calculating using the detection center C of the acceleration sensor 7, rather than the center E of the lens 30, as a reference, the shake amount Δy1 coincides with the amount of displacement of the acceleration sensor 7 in the Y axis direction, as shown in FIG. 20. The amount of displacement of the acceleration sensor 7 is obtained by subjecting the acceleration Δx in the X axis direction detected by the acceleration sensor 7 to time integration twice. More specifically, the shake amount Δy1 is expressed by the following equation.

[Mathematical Formula 27]

$$\Delta y1 = \int(\int Axdt)dt$$

As discussed above, the shake amount Δby (more specifically, the shake amounts Δy1 and Δy2) that is affected by positional offset of the rotational center can be calculated by a simple method, without finding the rotational center Oc directly, by using the detection center C of the acceleration sensor 7 as a reference. More specifically, an accurate shake amount Δy1 can be calculated from the acceleration Δx in the X axis direction obtained by the acceleration sensor 7, and an accurate rotational angle θy can be found from the angular velocity ωy around the Y axis obtained by the second angular velocity sensor 5.

Just as with the above-mentioned correction angle θx1, the correction angle θy1 corresponding to the shake amount Δy1 obtained from the acceleration sensor 7 is expressed by the following equation.

[Mathematical Formula 28]

$$\theta y1 = \tan^{-1}(\Delta y1/(L+L2))$$

Just as with the above-mentioned correction angle θx1, the drive amount Δdy1 corresponding to the correction angle θy1 can be found on the basis of the graph in FIG. 18. In addition, the drive amount Δdy2 for correcting image blur caused by the shake amount Δy2 can be calculated from the graph in FIG. 18 and from the rotational angle θy corresponding to the shake amount Δy2, as well as the above-mentioned shake amount Δx2. The drive amount My obtained by summing the drive amounts Δdy1 and Δdy2 becomes the final drive amount of the correcting lens 9. When the correcting lens 9 is driven in the X axis direction by this drive amount My, image blur caused by the shake amounts Δy1 and Δy2 can be corrected.

(3) Shake Amount when Viewed in the Z Axis Direction

Figure 21:
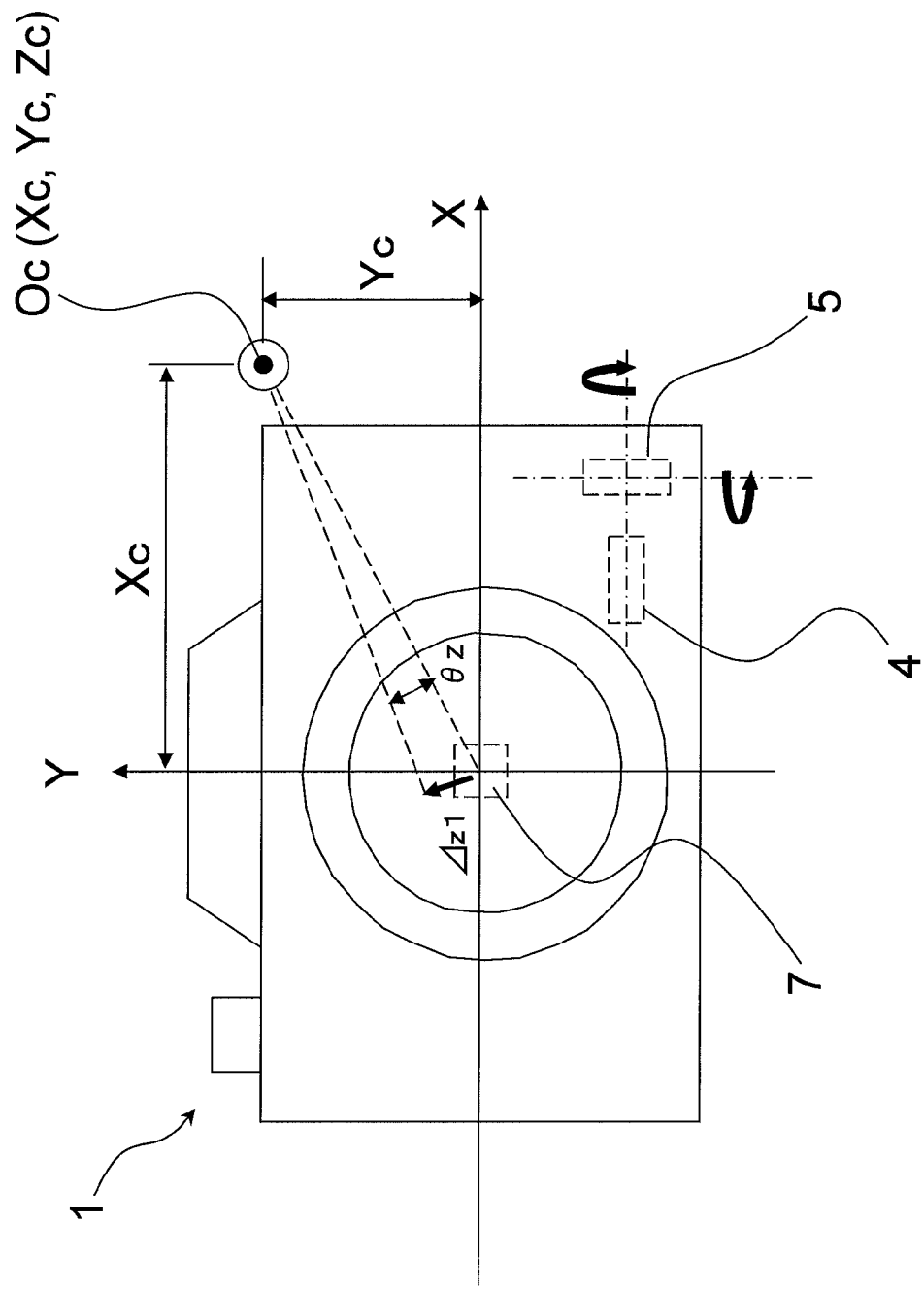
FIG. 21 is a diagram illustrating the shake amount when viewed in the Z axis direction.

The correction of image blur caused by rotational shake with an angle of θz (roll component) will be described. FIG. 21 is a diagram illustrating when the rotational center of the rotational shake of the camera 1 is Oc (Xc, Yc, Zc), and the rotational shake angle of the camera 1 around the Z axis is θz (roll component). The amount of shake of the camera 1 caused by roll is indicated by Formula 20, and is made up of the shake amount Δz2 when the rotational center Oc coincides with the detection center C of the acceleration sensor 7, and the shake amount Δz' caused by offset between the rotational center Oc and the detection center C of the acceleration sensor 7.

The shake amount Δz2 when the rotational center Oc coincides with the detection center C of the acceleration sensor 7 corresponds to the angle θz. The angle θz can be found by subjecting the angular velocity oz around the Z axis detected by the third angular velocity sensor 6 to time integration. The microcomputer 20 issues a command so that the rotary drive unit 11 is rotated in the opposite direction by the rotational angle θz on the basis of the calculated rotational angle θz. Consequently, rotational motion of the camera 1 around the Z axis is accompanied by rotation of the imaging element 17 with respect to the housing 2, and the shake amount Δz2 is corrected.

Figure 22:
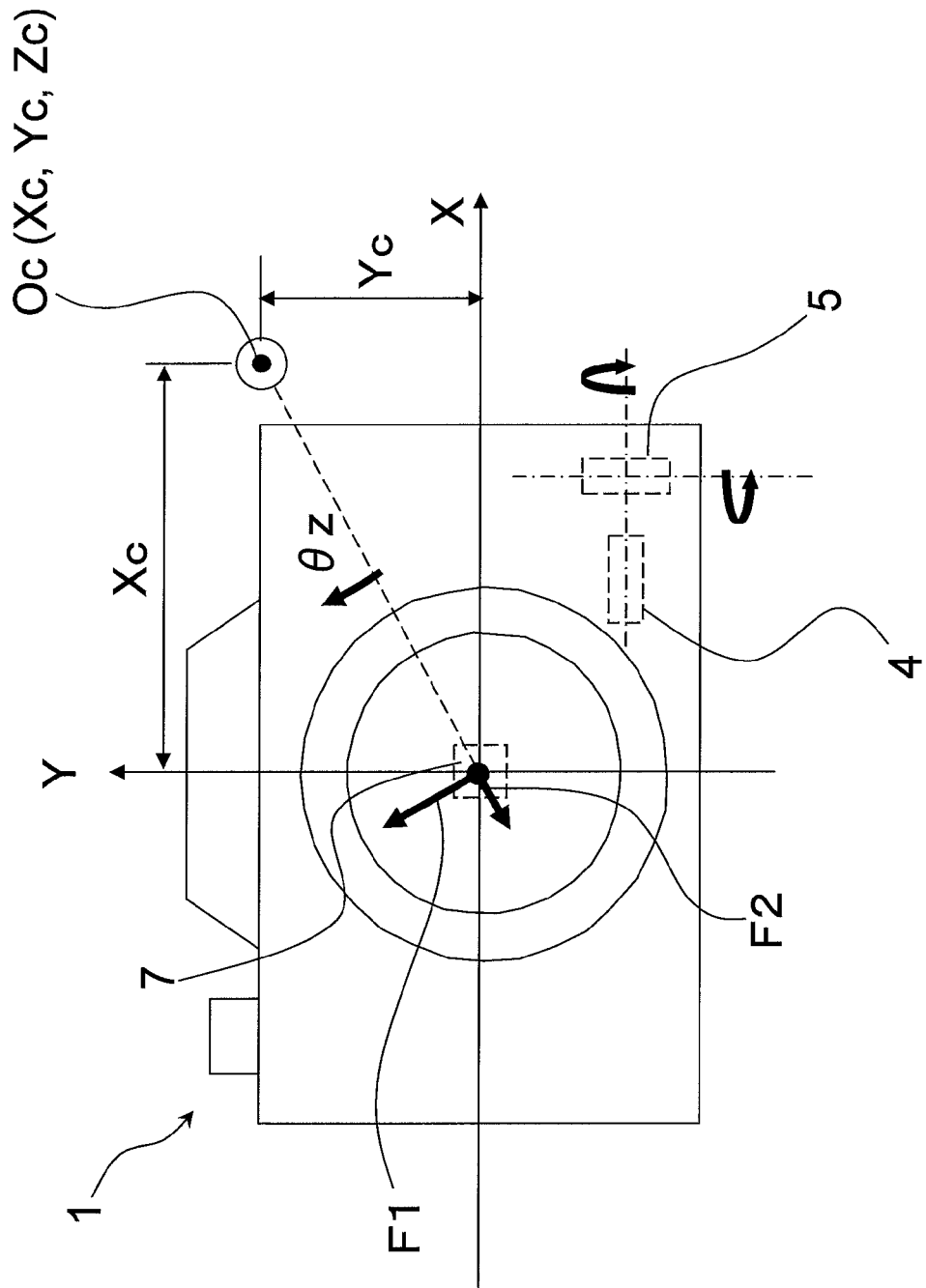
FIG. 22 is a diagram illustrating the shake amount when viewed in the Z axis direction.
Figure 23:
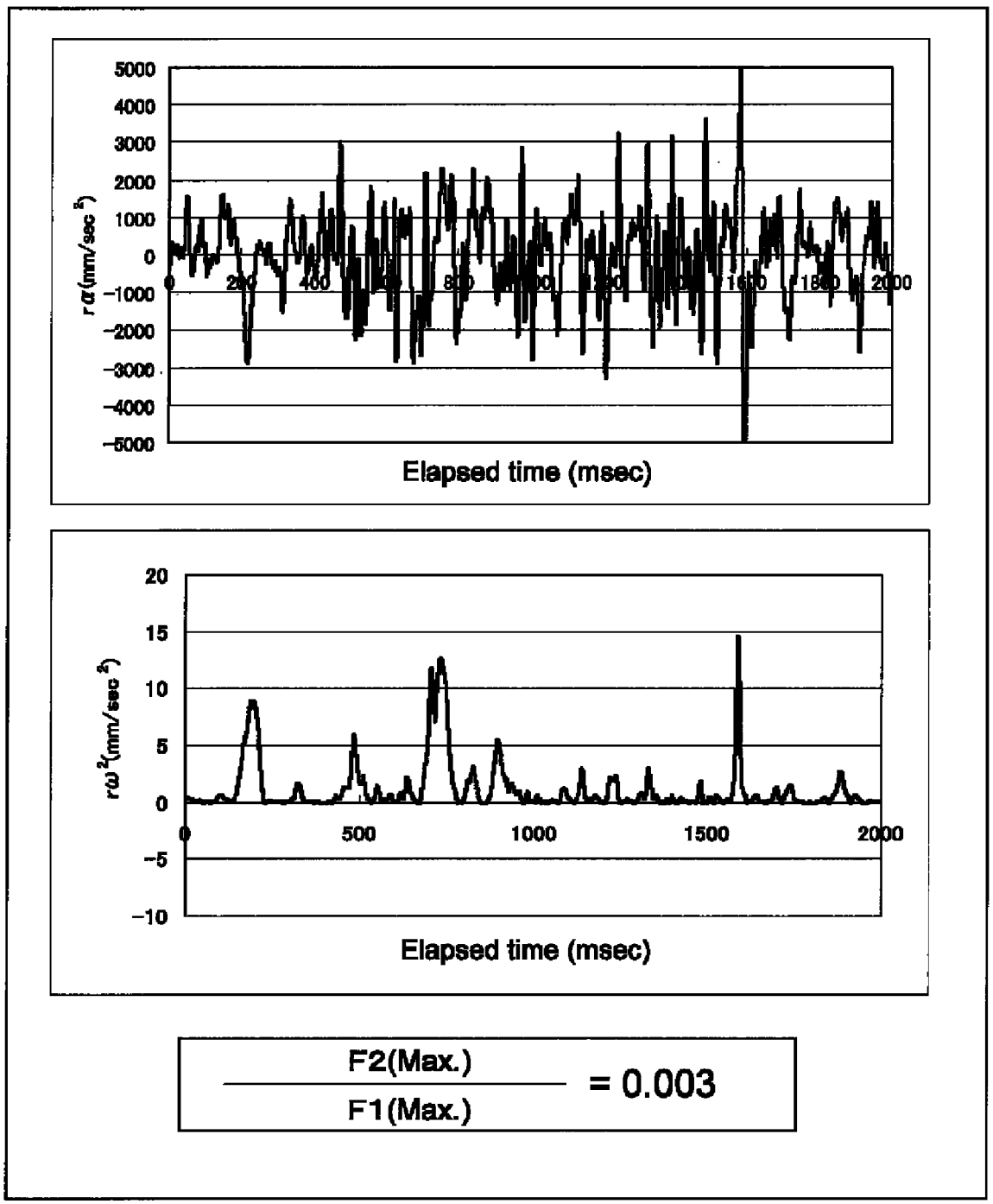
FIG. 23 shows the results (1) of measuring the rotational force F1 and the centrifugal force F2.
Figure 24:
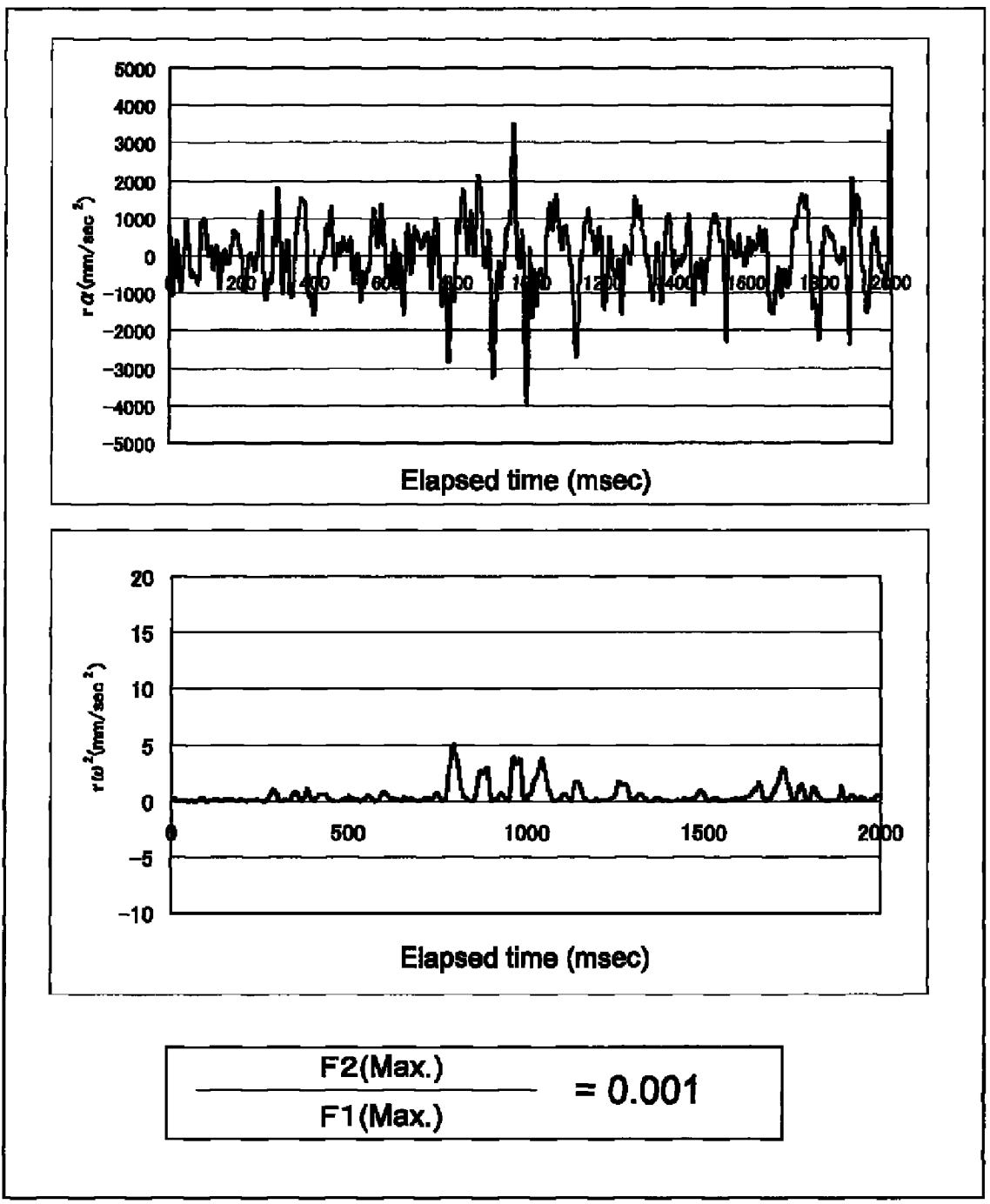
FIG. 24 shows the results (2) of measuring the rotational force F1 and the centrifugal force F2.
Figure 25:
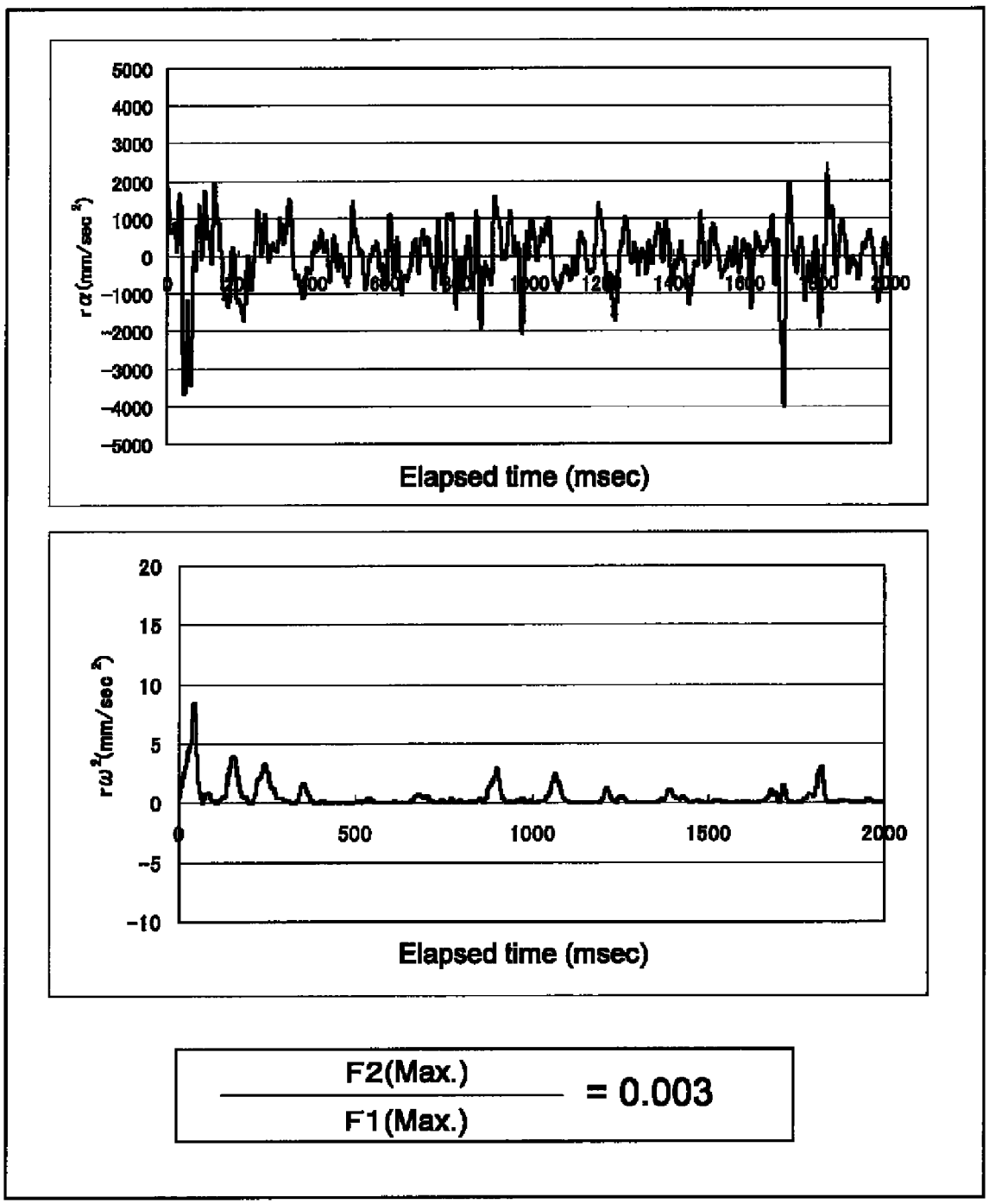
FIG. 25 shows the results (3) of measuring the rotational force F1 and the centrifugal force F2.
Figure 26:
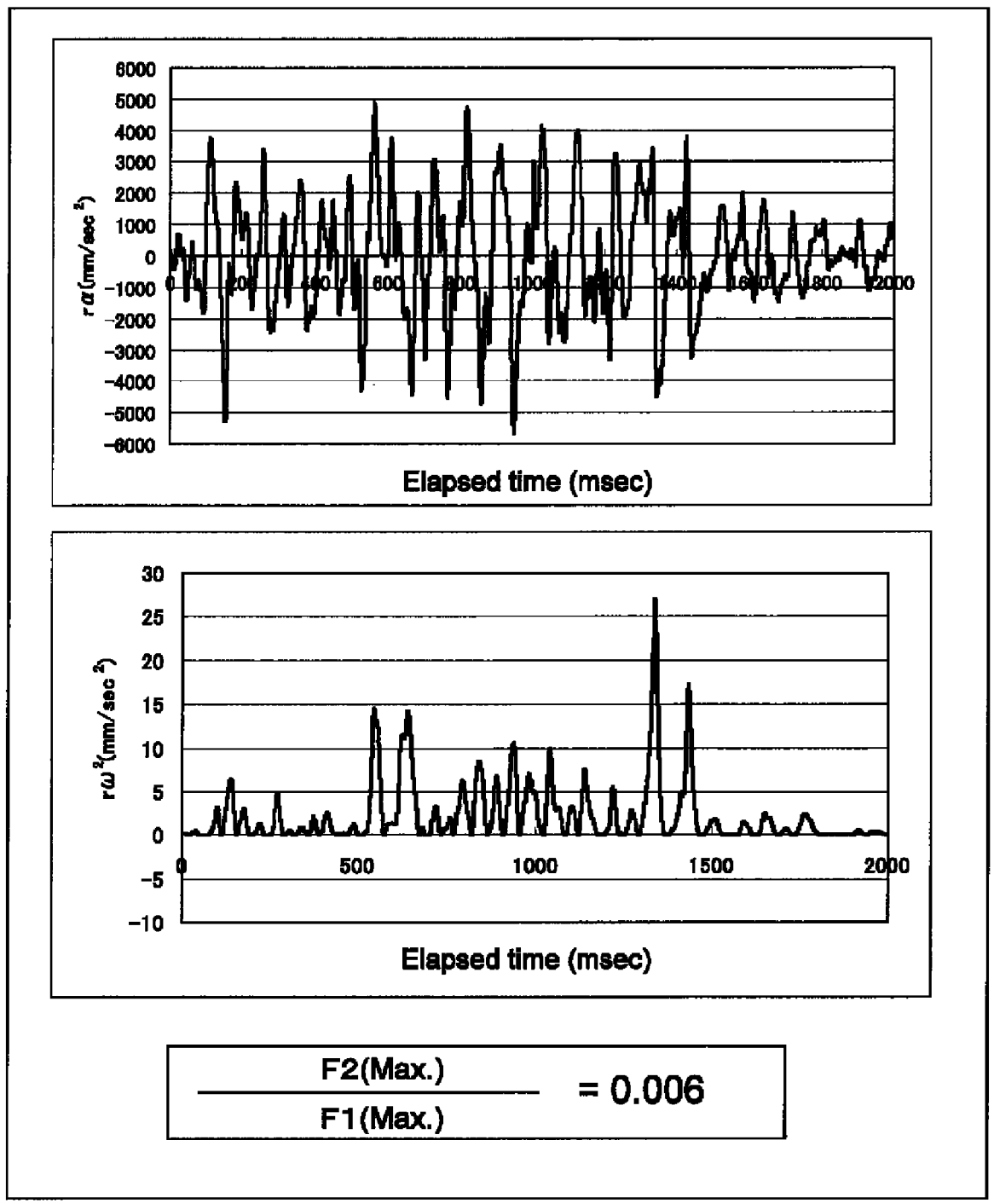
FIG. 26 shows the results (4) of measuring the rotational force F1 and the centrifugal force F2.
Figure 27:
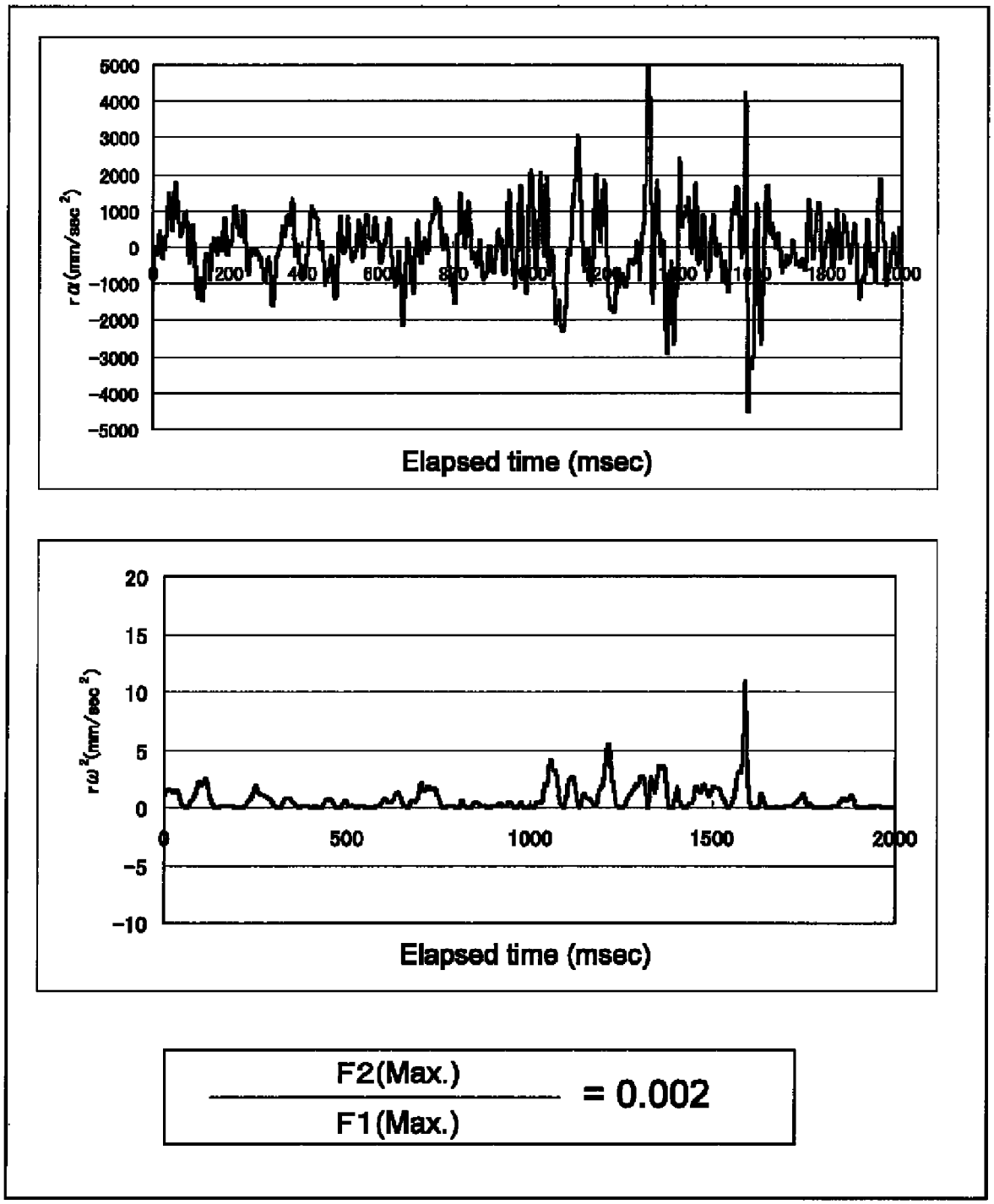
FIG. 27 shows the results (5) of measuring the rotational force F1 and the centrifugal force F2.

Next, the operation for correcting the shake amount Δz1 will be described. The shake amount Δz1 can be found from the detection result of the acceleration sensor 7. More specifically, as shown in FIG. 22, when rotational shake with a rotational angle θz (roll component) occurs, forces F1 and F2 act on the acceleration sensor 7. The force F1 indicates the rotational direction component (rotational force), while the force F2 indicates the radial direction component (centrifugal force).

An experiment in which the rotational force F1 and the centrifugal force F2 were found was conducted to examine the relation between the rotational force F1 and the centrifugal force F2. Theoretically, the rotational force F1 and the centrifugal force F2 are expressed by the following equations.

[Mathematical Formula 29]

$$F1/m = r\alpha$$

[Mathematical Formula 30]

$$F2/m = r\omega^2$$

Here, m is the mass of the rotating camera, r is the rotation radius, ω is the angular velocity, and α is the angular acceleration. The angular acceleration a can be found by subjecting the output of the third angular velocity sensor 6 to time integration.

The measurement results found from the output of the third angular velocity sensor 6 are shown in FIGS. 23 to 27. In FIGS. 23 to 27, the upper graph shows the value corresponding to the rotational force F1 (rotation radius r × angular acceleration a in the tangential direction), and the lower graph shows the value corresponding to the centrifugal force F2 (the square of the rotation radius ω×the angular velocity ω). The formula at the bottom of each drawing indicates the ratio of the maximum value of the rotational force F1 and the maximum value of the centrifugal force F2, that is, the value of F2/F1. FIGS. 23 to 27 show the results of measuring with five test subjects.

It can be seen from the results in FIGS. 23 to 27 that since the rotational angle is a relatively small value, essentially with a maximum of 0.5°, the centrifugal force F2 is quite low, being less than 1% of the rotational force F1, and can therefore be safely ignored. Similarly, experimental results with the first angular velocity sensor 4 and the second angular velocity sensor 5 are the same as the experimental results with the third angular velocity sensor 6, so centrifugal force may be ignored with no problem at all.

Because of the above, the rotational force F1 in FIG. 22 can be considered to be the force that is applied to the acceleration sensor 7. Since the centrifugal force F2 can thus be ignored, if the acceleration sensor 7 is disposed along the optical axis A, the force acting on the acceleration sensor 7 will be in the same direction as the displacement amount Δz1 upon rotation by the angle θz (roll component) using the point Oc (Xc, Yc, Zc) as the rotational center.

Here, since gravitational acceleration is also acting on the acceleration sensor 7, gravitational acceleration must also be taken into account. In this case, the acceleration sensor 7 is rotationally driven by the rotary drive unit 11 along with the imaging element 17 with respect to the housing 2. Accordingly, there is almost no change in the angle (orientation) of the acceleration sensor 7 with respect to gravitational acceleration. Therefore, if the output value of the acceleration sensor 7 (such as the total acceleration of the accelerations Ax and Ay) at the start of image blur correction, or from when the power is switched on until the start of image blur correction, is stored in a RAM, for example, and this stored output value is subtracted from the output of the acceleration sensor 7 during image blur correction, then the effect of the gravitational acceleration component can be eliminated during image blur correction. This computation is performed by the microcomputer 20, for example. Gravitational acceleration can be considered to be the minimum value of the detected acceleration Ay of the acceleration sensor 7 in the Y axis direction. The shake amount Δz1 can be calculated by subjecting the output of the acceleration sensor 7 to time integration twice.

Thus, with this camera 1, the shake amount Δz1 of the optical system upon rotation by the angle θz (roll component) using the point Oc (Xc, Yc, Zc) as the rotational center can be found by a simple method, using the output of the acceleration sensor 7, without finding the position of the rotational center Oc (Xc, Yc, Zc) directly.

The value obtained by subtracting the gravitational acceleration component from the X axis direction component of this shake amount Δz1 (more precisely, the first sensitivity axis Sx component of the shake amount Δz1), that is, from the detection result of the acceleration sensor 7, and then subjecting the result to time integration twice shall be termed Δz1$x$, and the value obtained by subtracting the gravitational acceleration component from the Y axis direction component of the shake amount Δz1 (more precisely, the second sensitivity axis Sy component of the shake amount Δz1), that is, from the detection result of the acceleration sensor 7, and then subjecting the result to time integration twice shall be termed Δz1$y$. The shake amounts Δz1$x$ and Δz1$y$ can be corrected by driving the correcting lens 9 in the X and Y axis directions.

Translational Shake

Next, the correction of image blur caused by translational shake of the camera 1 will be described. Here, as described with the results of examining the effect of the translation component of the camera 1 on the image blur amount in FIGS. 13A to 15C, it can be seen that the shake amount ΔZ of the Z axis component may be ignored with no adverse effect. Therefore, translational shake of the camera 1 may be considered to be the translational shake amounts ΔX and ΔY.

(1) Translational Shake Amount ΔY

First, the correction operation when the camera 1 moves by the translational shake amount ΔY will be described. As shown in FIG. 16, when the translational shake amount ΔY occurs, the acceleration sensor 7 also moves by the same distance in the Y axis direction, so the translational shake amount ΔY can be found from the acceleration Ay in the Y axis direction (more precisely, the direction along the second sensitivity axis Sy) detected by the acceleration sensor 7.

The correction angle θyh corresponding to this translational shake amount ΔY is expressed by the following equation.

[Mathematical Formula 31]

$$\theta yh = \tan^{-1}(\Delta Y/(L+L2))$$

Just as with the above-mentioned correction angle θx1, the drive amount Δdyh corresponding to the correction angle θyh can be found on the basis of the graph in FIG. 18. The image blur caused by the translational shake amount ΔY can be corrected by moving the correcting lens 9 with the first drive unit 10 by the drive amount Δdyh.

(2) Translational Shake Amount ΔX

Similarly, the correction operation will be described for when the translational shake amount ΔX occurs. As shown in FIG. 20, when the translational shake amount ΔX occurs, the acceleration sensor 7 also moves by the same distance in the X axis direction, so the translational shake amount ΔX can be found from the acceleration Ax in the X axis direction (more precisely, the direction along the first sensitivity axis Sx) detected by the acceleration sensor 7.

The correction angle θxh corresponding to this translational shake amount ΔX is expressed by the following equation.

[Mathematical Formula 32]

$$\theta xh = \tan^{-1}(\Delta X/(L+L2))$$

Just as with the above-mentioned correction angle θyh, the drive amount Δdxh corresponding to the correction angle θxh can be found on the basis of the graph in FIG. 18. The image blur caused by the translational shake amount ΔX can be corrected by moving the correcting lens 9 with the second drive unit 12 by the drive amount Δdxh.

As discussed above, if the detection center C of the acceleration sensor 7 is disposed along the optical axis A, and the shake amount of the camera 1 is calculated using the detection center C as a reference, then the calculated shake amount will be nearly unaffected by offset of the detection center C and the rotational center Oc during the correction of the various components of rotation, namely, the rotational angles θx (pitch component), θy (yaw component), and θz (roll component). This means that more accurate image blur correction can be achieved with this camera 1.

Also, image blur correction using the output of the acceleration sensor 7 is possible for translational shake of the camera 1.

Total Shake Amount

The shake amounts calculated above are compiled below by component.

(1) Total Shake Amount in Y Axis Direction

Figure 28:
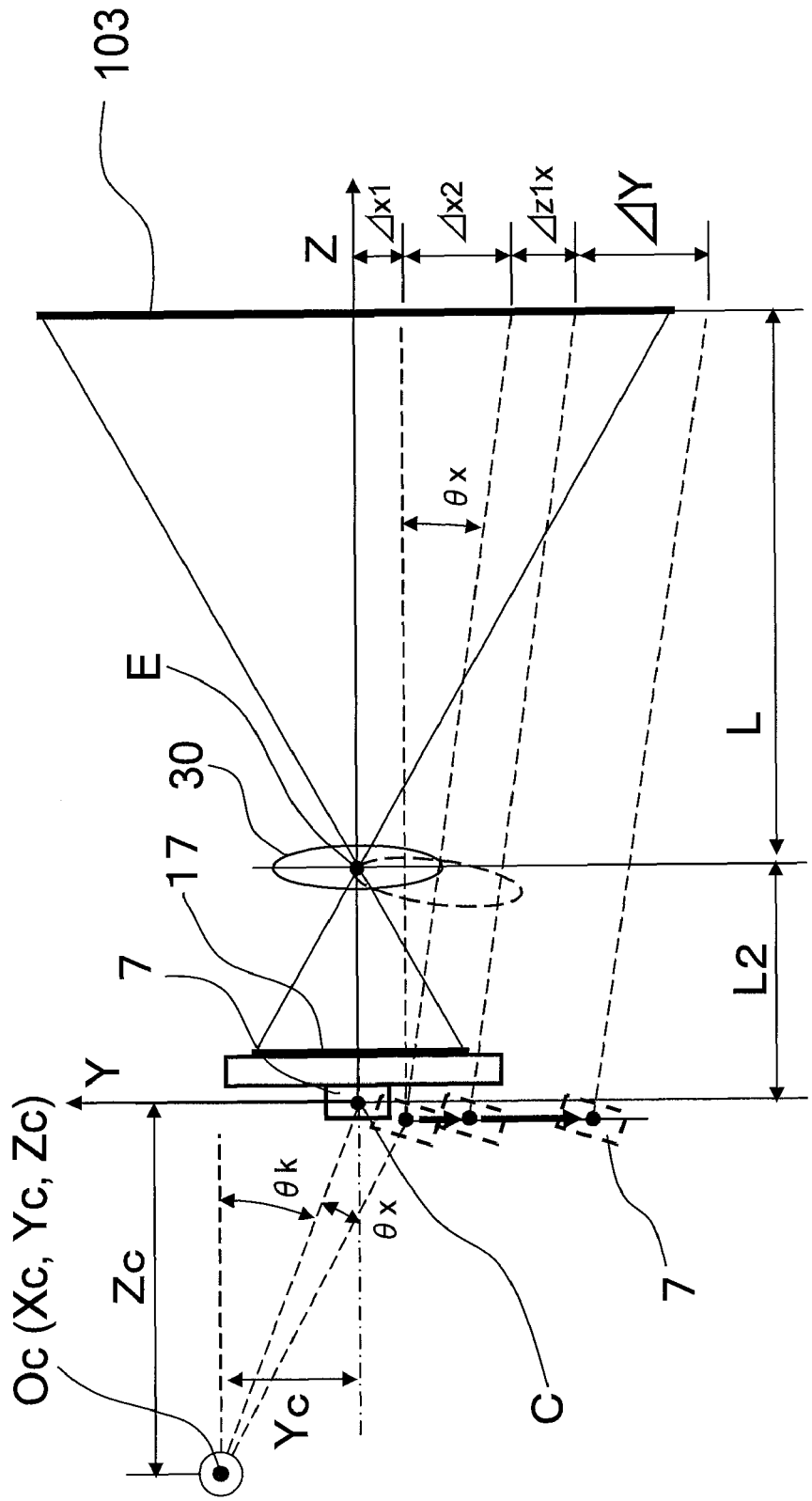
FIG. 28 is a diagram of the total amount of shake in the Y axis direction.

FIG. 28 shows the total shake amount in the Y axis direction. In FIG. 28, the shake amount Δx1 is the shake amount attributable to the fact that Yc and Zc of the rotational center Oc are not zero. The shake amount Δx2 is the shake amount attributable to rotational shake around the X axis. The shake amount Δz1x is the shake amount attributable to the fact that Xc and Yc of the rotational center Oc are not zero. The shake amount ΔY is the Y axis direction component of translational shake of the camera 1. Here, the components that utilize the output of the acceleration sensor 7 are the shake amounts Δx1, Δz1x, and ΔY.

The correction angle θxt (an example of a first correction amount) corresponding to all the shake amounts that utilize the output of the acceleration sensor 7 is expressed by the following equation.

[Mathematical Formula 33]

$$\theta xt = \tan^{-1}((\Delta x1 + Az1x + \Delta Y)/(L+L2))$$

The drive amount Δdxt of the correcting lens 9 is calculated by the correction computer 21 from the relation in FIG. 18, on the basis of the optical zoom ratio during imaging and the correction angle θxt found from Formula 33. The image blur caused by the shake amounts Δx1, Δz1x, and ΔY can be corrected by moving the correcting lens 9 with the first drive unit 10 by the drive amount Δdxt.

As to the shake amount Δx2, the drive amount Δdx2 of the correcting lens 9 is calculated by the correction computer 21 from the relation in FIG. 18, on the basis of the optical zoom ratio during imaging and the rotational angle θx (an example of a second correction amount) calculated from the angular velocity ωx detected by the first angular velocity sensor 4.

The operation of the first drive unit 10 is controlled by the drive controller 22 so that the drive amount Δdx, which is the sum of the drive amounts Δdxt and Δdx2, will be calculated by the correction computer 21, and the correcting lens 9 will move by the drive amount Δdx.

The image blur caused by the shake amounts Δx1, Δx2, Δz1x, and ΔY can be corrected by a simple method, using the detection results of the first angular velocity sensor 4 and the acceleration sensor 7.

A correction angle θxt that also takes into account a case in which the shake directions of the shake amounts Δx1, Δz1x, and ΔY are different can be obtained by using the displacement amount calculated on the basis of the detection result of the acceleration sensor 7.

(2) Total Shake Amount in X Axis Direction

Figure 29:
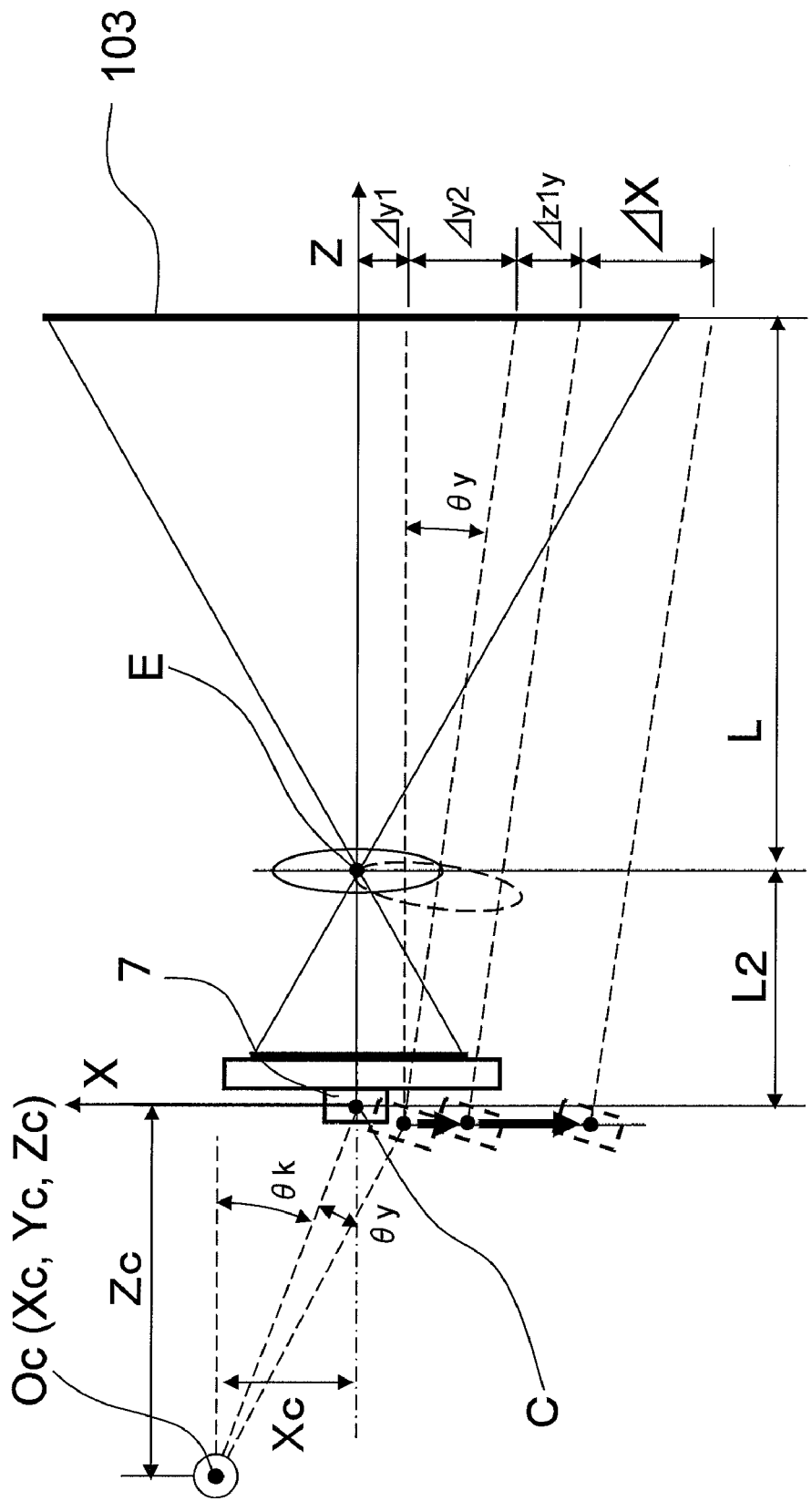
FIG. 29 is a diagram of the total amount of shake in the X axis direction.

FIG. 29 shows the total shake amount in the X axis direction. In FIG. 29, the shake amount Δy1 is the shake amount attributable to the fact that Xc and Zc of the rotational center Oc are not zero. The shake amount Δy2 is the shake amount attributable to rotational shake around the Y axis. The shake amount Δz1y is the shake amount attributable to the fact that Xc and Yc of the rotational center Oc are not zero. The shake amount ΔX is the X axis direction component of translational shake of the camera 1. Here, the components that utilize the output of the acceleration sensor 7 are the shake amounts Δy1, Δz1y, and ΔX.

The correction angle θyt (an example of a first correction amount) corresponding to all the shake amounts that utilize the output of the acceleration sensor 7 is expressed by the following equation.

[Mathematical Formula 34]

$$\theta yt = \tan^{-1}((\Delta y1 + \Delta z1y + \Delta X)/(L+L2))$$

The drive amount Δdyt of the correcting lens 9 is calculated by the correction computer 21 from the relation in FIG. 18, on the basis of the optical zoom ratio during imaging and the correction angle θyt found from Formula 34. The image blur caused by the shake amounts Δy1, Δz1y, and ΔX can be corrected by moving the correcting lens 9 with the second drive unit 12 by the drive amount Δdyt.

As to the shake amount Δy2, the drive amount Δdy2 of the correcting lens 9 is calculated by the correction computer 21 from the relation in FIG. 18, on the basis of the optical zoom ratio during imaging and the rotational angle θy (an example of a second correction amount) calculated from the angular velocity ωy detected by the second angular velocity sensor 5.

The operation of the second drive unit 12 is controlled by the drive controller 22 so that the drive amount My, which is the sum of the drive amounts Δdyt and Δdy2, will be calculated by the correction computer 21, and the correcting lens 9 will move by the drive amount My.

Thus, the image blur caused by the shake amounts Δy1, Δy2, Δz1y, and ΔX can be corrected by a simple method, using the detection results of the second angular velocity sensor 5 and the acceleration sensor 7.

A correction angle θyt that also takes into account a case in which the shake directions of the shake amounts Δy1, Δz1y, and ΔX are different can be obtained by using the displacement amount calculated on the basis of the detection result of the acceleration sensor 7.

(3) Total Shake Amount in Roll Direction

Regarding the total amount of shake around the Z axis, the shake amounts Δz1x and Δz1y caused by offset of the detection center C and the rotational center Oc are corrected as shake in the X and Y axis directions, as discussed above. Accordingly, at this point only the rotational component Δz2 of the shake amount need be corrected. Specifically, the amount of rotation of the rotary drive unit 11, that is, the angle θz, is calculated by the correction computer 21 so as to cancel out shake on the basis of the rotational angle θz calculated from the angular velocity ωz detected by the third angular velocity sensor 6 around the Z axis. The operation of the rotary drive unit 11 is controlled by the drive controller 22 of the microcomputer 20 so that the rotary plate 18 will rotate by the calculated rotational angle θz. Accordingly, the imaging element 17 rotates by the angle θz according to shake of the angle θz, and image blur caused by the shake amount Δz2 can be corrected.

Features of Camera

Features of the Camera 1 are Discussed Below.

(1)

With the camera 1, since the shake amounts Δx2 and Δy2 are calculated by the correction computer 21 using the position of the acceleration sensor 7, and more precisely the rotational center Oc of the acceleration sensor 7, as a reference, error between the calculated shake amount and the actual shake amount can be greatly reduced by using the position of the acceleration sensor 7 as a reference. For example, as shown in FIGS. 18 and 19, error between the calculated shake amount and the actual shake amount can be reduced by the difference between the above-mentioned shake amounts Δx2 and Δx2', or the shake amounts Δy2 and Δy2'. Consequently, more accurate drive amounts Δdx and Δdy of the correcting lens 9 can be calculated, and image blur correction performance can be enhanced.

(2)

With the camera 1, since the distance L2 between the acceleration sensor 7 and the optical system O is taken into account in the calculation of the drive amount Δd by the correction computer 21, even if the shake amount of the camera 1 changes according to the position of the rotational center Oc, error can be suppressed between the calculated shake amount and the actual shake amount caused by the distance L2.

(3)

With the camera 1, since the acceleration sensor 7 overlaps the optical axis A when viewed along the optical axis A, the acceleration sensor 7 is disposed near the optical axis A. More precisely, when viewed along the optical axis A, the detection center C of the acceleration sensor 7 substantially coincides with the optical axis A. Accordingly, error in the shake amounts Δx1, Δx2, Δy1, and Δy2 can be reduced, and more accurate drive amounts Δdx and Δdy can be calculated.

The phrase "the detection center C substantially coincides with the optical axis A" here encompasses a case in which the detection center C completely coincides with the optical axis A, as well as a case in which the detection center C is offset from the optical axis A to the extent that image blur correction performance is still improved.

(4)

With the camera 1, since the operation of the rotary drive unit 11 is controlled by the drive controller 22 according to the rotational angle θz around the Z axis acquired by the third angular velocity sensor 6, the imaging element 17 can be rotationally driven according to the change in the orientation (angle) of the camera 1. This means that image blur attributable to rotational shake of the camera 1 around the Z axis can be corrected.

Furthermore, since the acceleration sensor 7 can be rotationally driven along with the imaging element 17 by the rotary drive unit 11, the orientation of the acceleration sensor 7 can be kept constant with respect to the vertical direction in which gravitational acceleration acts, for example. Consequently, the effect (noise) of the gravitational acceleration component can be eliminated ahead of time from the displacement amount acquired by the acceleration sensor 7, and the acceleration acquired by the acceleration sensor 7, and the displacement amount calculated from the acceleration, can be increased in precision. Specifically, image blur correction performance can be enhanced with this camera 1.

(5)

With the camera 1, the acceleration sensor 7 is disposed close to the rotational axis K of the rotary drive unit 11. More precisely, when viewed along the optical axis A, the detection center C of the acceleration sensor 7 substantially coincides with the rotational axis K of the rotary drive unit 11. Accordingly, centrifugal force produced by rotary drive is less apt to act on the acceleration sensor 7. This further improves the precision of the displacement amount acquired by the acceleration sensor 7.

(6)

With the camera 1, since the acceleration sensor 7 is disposed on the opposite side of the rotary plate 18 from the imaging element 17, it is possible to achieve a configuration in which the imaging element 17 and the acceleration sensor 7 rotate integrally, without blocking light that is incident on the imaging element 17.

Second Embodiment

In the above embodiment, the correcting lens 9 was driven by the first drive unit 10 and the second drive unit 12 on the basis of the drive amount Δd of the correcting lens 9.

However, for example, the rotational components Δx2 and Δy2 of rotational shake may be corrected by drive of the correcting lens 9, and the shake amounts Δx1, Δy1, and Δz1 caused by remaining translation may be corrected by moving the imaging element 17 in a direction perpendicular to the optical axis A. Specifically, the optical image blur correction apparatus and the sensor shift type of image blur correction apparatus are controlled separately in this embodiment.

Those components that are substantially the same as in the above embodiment will be numbered the same, and will not described again.

Figure 30:
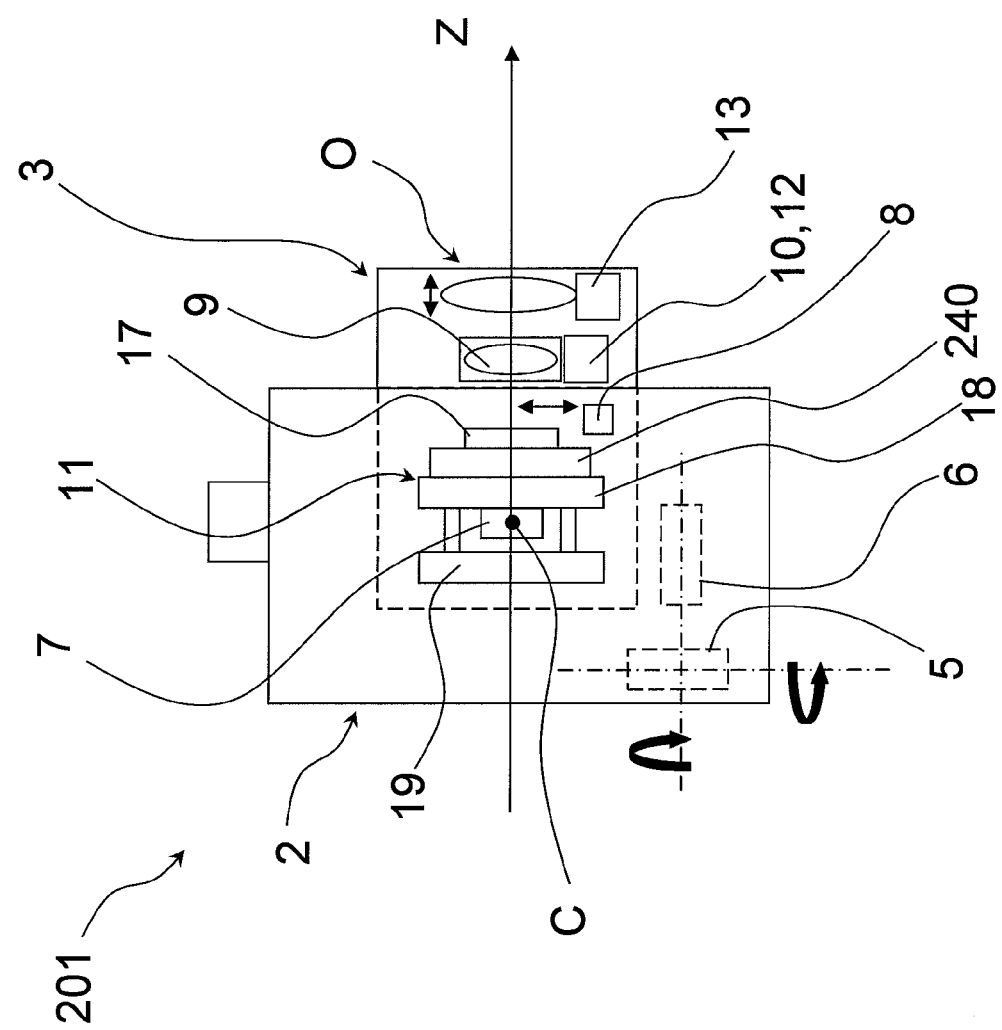
FIG. 30 is a simplified diagram of a camera configuration (second embodiment)
Figure 31:
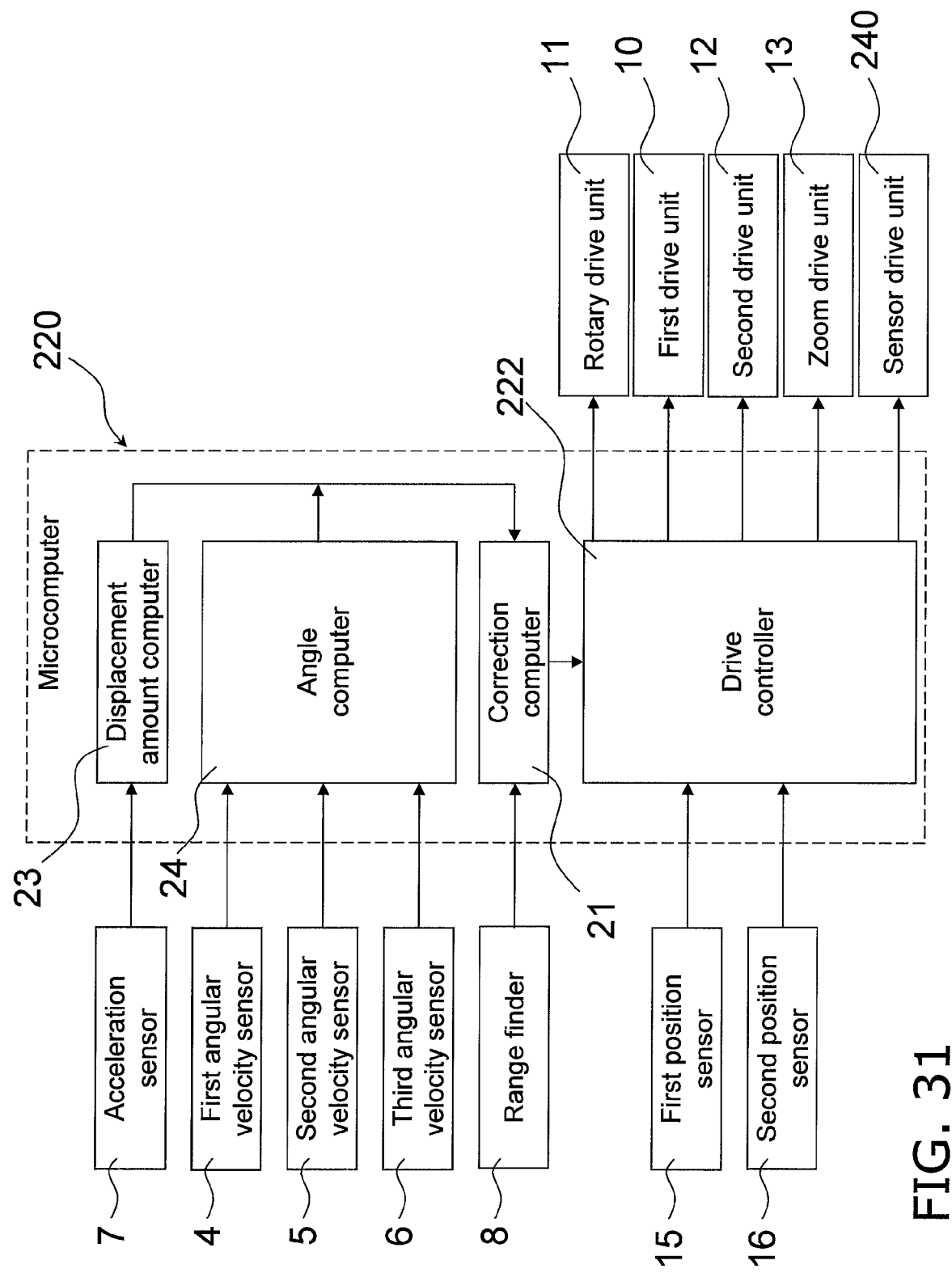
FIG. 31 is a block diagram of the camera (second embodiment)

As shown in FIGS. 30 and 31, this camera 201 has a sensor drive unit 240 (an example of an imaging element driver) that drives the imaging element 17 in two directions perpendicular to the optical axis A with respect to the rotary plate 18 of the rotary drive unit 11. The sensor drive unit 240 drives the imaging element 17 with respect to the optical axis A so as to change the light receiving position of the optical image of the subject 103. A drive controller 222 of a microcomputer 220 can also control the operation of the sensor drive unit 240, in addition to that of the first drive unit 10 and the second drive unit 12. For example, the imaging element 17 and the sensor drive unit 240 constitute a second corrector that uses an imaging element to perform image blur correction.

Here, for example, just as in the above embodiment, the shake amounts Δx1, Δz1x, and ΔY are calculated by a correction computer 221 from the correction angle θxt (an example of a first correction amount). The correction angle θyt (an example of a first correction amount) is calculated by the correction computer 221 from the shake amounts Δy1, Δz1y, and ΔX. Just as in the graph shown in FIG. 18, data indicating the relation between the correction angle θxt and the drive amount of the imaging element 17 is calculated ahead of time and stored in the ROM, for example. The drive amount Δdx1 corresponding to the correction angle θxt is found by the correction computer 221 on the basis of this data. Similarly, in the case of the correction angle θyt, a drive amount Δdy1 corresponding to the correction angle θyt is found by the correction computer 221. The operation of the sensor drive unit 240 is controlled by the drive controller 222 on the basis of the drive amounts Δdx1 and Δdy1 thus found, and the imaging element 17 moves in a direction perpendicular to the optical axis A. Consequently, image blur caused by the shake amounts Δx1, Δz1x, ΔY, Δy1, Δz1y, and ΔX is corrected.

Meanwhile, for the shake amounts Δx2 and Δy2, just as in the above embodiment, the drive amounts Δdx2 and Δdy2 (examples of a second correction amount) corresponding to the correction angles θx and θy are calculated by the correction computer 221. The operation of the first drive unit 10 and the second drive unit 12 is controlled by the drive controller 222 on the basis of the drive amounts Δdx2 and Δdy2. Consequently, image blur caused by the shake amounts Δx2 and Δy2, which are the rotational components of rotational shake, can be corrected by adjustment of the optical path of the correcting lens 9.

As mentioned above, with this camera 201, the imaging element 17 is driven by the sensor drive unit 240 on the basis of the drive amounts Δdx1 and Δdy1, and the correcting lens 9 is driven by the first drive unit 10 and the second drive unit 12 on the basis of the drive amounts Δdx2 and Δdy2. Therefore, the drive amounts of the drive units 240, 10, and 12 can be kept lower than when just the correcting lens 9 or the imaging element 17 is driven.

In addition, since image blur correction is performed by image processing, degradation of the image by image blur correction can be prevented. Consequently, the movable ranges of the correcting lens 9 and the imaging element 17 can be kept small, and more accurate image blur correction can be performed. Specifically, with this camera 201, good image blur correction performance can be maintained while the size of the camera is reduced.

Also, with this camera 201, it is possible to control the image blur correction mechanism by optical or sensor shift method, with which simultaneous control was difficult.

Other Embodiments

The specific constitution of the present invention is not limited to or by the above embodiments, and various modifications and changes are possible without departing from the gist of the invention.

(1)

In the above embodiments, the correcting lens 9 was driven in the X and Y axis directions, and the imaging element 17 was rotationally driven, but how the correcting lens 9 and the imaging element 17 are driven is not limited to this. For example, a method may be employed in which there is no correcting lens 9, and the imaging element 17 is rotationally driven around the Z axis along with being driven in the X and Y axis directions. In this case, the relation between the drive amount Δd of the imaging element 17 and the correction angle Δθ corresponding to this drive method may be found as in FIG. 17.

(2)

Instead of driving the correcting lens 9 in the X and Y axis directions, the lens barrel 3 may be rotationally driven with respect to the housing 2.

(3)

Optical image blur correction was described in the above embodiments, but image blur may be corrected electrically by subjecting an image signal acquired by the imaging element 17 to special processing. In this case, for example, the locations where the image signals are read into and written from the memory are controlled by an image recording unit.

(4)

In the above embodiments, a method was employed in which the acceleration sensor 7 was rotationally driven by the rotary drive unit 11 along with the imaging element 17, but the acceleration sensor 7 may be fixed with respect to the housing 2 or the lens barrel 3.

Here again, the direction of the gravitational acceleration component may deviate somewhat from the vertical direction, but since the maximum for the rotational angle θz around the Z axis is about 0.5°, the effect of gravitational acceleration on the acceleration detected by the acceleration sensor 7 can be reduced, and image blur correction performance can be better than in the past.

In this case, it is preferable if the detection center C of the acceleration sensor 7 coincides with the optical axis A when viewed along the optical axis A.

An advantage to this situation is that the first and second sensitivity axes Sx and Sy of the acceleration sensor 7 to not move relative to the X and Y axes provided to the housing 2. Consequently, the direction of acceleration detected by the acceleration sensor 7 coincides with the X and Y axes, and the drive amount is calculated more precisely by the correction computer 21.

(5)

It is also conceivable that a bending optical system such as a prism will be included in the optical system O. If so, the incident light axis from the subject to the prism corresponds to the above-mentioned optical axis A. Therefore, the acceleration sensor 7 is provided using the incident light axis as a reference.

(6)

In the above embodiments, the center of the imaging element 17, the rotational axis K of the rotary drive unit 11, and the detection center C of the acceleration sensor 7 substantially coincided with the optical axis A, but these may be offset from each other to the extent that the image blur correction effect is improved.

In particular, if the acceleration sensor 7 is disposed on the rotary plate 18 of the rotary drive unit 11, since the rotary plate 18 rotates according to the movement of the housing 2 as discussed above, acceleration of substantially the same size and direction as the acceleration detected on the optical axis A can be detected. Accordingly, the acceleration sensor 7 may be provided to the rotary drive unit 11, and there is no need for the detection center C to be disposed on the optical axis A.

Also, since the acceleration sensor 7 and the imaging element 17 are both provided on the rotary plate 18, there is no change in the relative positions of the acceleration sensor 7 and the imaging element 17. For example, when the imaging element 17 is driven by the rotary drive unit 11 according to the rotation of the camera 1 around the optical axis A, the acceleration sensor 7 is also accordingly driven rotationally with respect to the housing 2. Therefore, the orientation of the imaging element 17 and the acceleration sensor 7 with respect to the vertical direction (or the horizontal direction) of the earth is kept constant. This means that the amount of displacement calculated from the accelerations Δx and Δy detected by the acceleration sensor 7 will have substantially the same value as the displacement amount at the rotational axis K of the rotary drive unit 11. Consequently, even if the rotational center Oc is offset from the detection center C of the acceleration sensor 7, the displacement amount calculated from the acceleration detected by the acceleration sensor 7 will tend to be unaffected by the offset of the rotational center Oc.

(7)

In the above embodiments, the above-mentioned correction method was employed on all image blur in the pitch, yaw, and roll directions, but the image blur correction performance of the camera 1 will be improved if the above-mentioned method is used to correct just one component out of the pitch, yaw, and roll directions. For example, when the above-mentioned correction method is applied to just the pitch direction, and a conventional correction method is applied to image blur in the yaw and roll directions, the image blur correction performance of the camera 1 will still be improved.

In the above embodiments, the rotary drive unit 11 was used to correct image blur in the roll direction, but the rotary drive unit 11 need not be installed. In this case, the image blur correction performance of the camera can be improved as long as the above-mentioned correction method is applied to either the pitch or the yaw direction.

(8)

In the above embodiments, the output value of the acceleration sensor 7 at the start of image blur correction, or from when the power is switched on until the start of image blur correction, was used as the gravitational acceleration, but this is not the only way to determine the gravitational acceleration. For example, the detected acceleration when the angular velocities detected by the first to third angular velocity sensors 4 to 6 have dropped below a specific value may be used as the gravitational acceleration. In this case, since the detected acceleration in a state in which there is virtually no movement of the camera 1 is used as the gravitational acceleration, the gravitational acceleration components tends not to include any extra components such as centrifugal force, and this improves the precision of the gravitational acceleration component. Consequently, the gravitational acceleration component can be removed from the acceleration detected by the acceleration sensor 7 during image blur correction, and this improves the precision of the displacement amount.

Furthermore, whether or not the camera 1 is in a horizontal state (such as a state in which the Y axis is parallel to the vertical direction) can be decided on the basis of the image signal acquired by the imaging element 17. It can be considered the acceleration that is detected when the camera 1 is in the horizontal state as the gravitational acceleration, which increases precision of the gravitational acceleration component. In this case, precision of the gravitational acceleration component can be increased even though the acceleration sensor 7 is not rotated with respect to the housing 2 by the rotary drive unit 11.

(9)

In the above embodiments, the use of an optical image blur correction apparatus was described, but a sensor shift or electronic type of image blur correction apparatus may be used instead. Sensor shift is a method in which image blur correction is performed by moving the imaging element 17 with respect to the optical axis A. An electronic method involves performing image blur correction by subjecting an image signal obtained by the imaging element 17 to specific image blur correction processing. With an electronic method, there is the risk of image deterioration by the image blur correction processing, but if the image blur correction performance is boosted along with an increase in the precision of the shake amount or correction angle to a greater extent than the image deteriorates, then the overall image blur correction performance of the camera can be considered to have improved.

Similarly, in the second embodiment above, an example of combining optical and sensor shift image blur correction apparatuses was described, but one of the image blur correction apparatuses may instead be electronic. For example, an improvement in image blur correction performance can be anticipated when optical and electronic image blur correction apparatuses are combined. Similarly, an improvement in image blur correction performance can be anticipated when sensor shift and electronic image blur correction apparatuses are combined.

(10)

In the above embodiments, an example of an integrated camera was described, but the present invention can also be applied to a single lens reflex camera composed of an interchangeable lens and a camera body.

Figure 32:
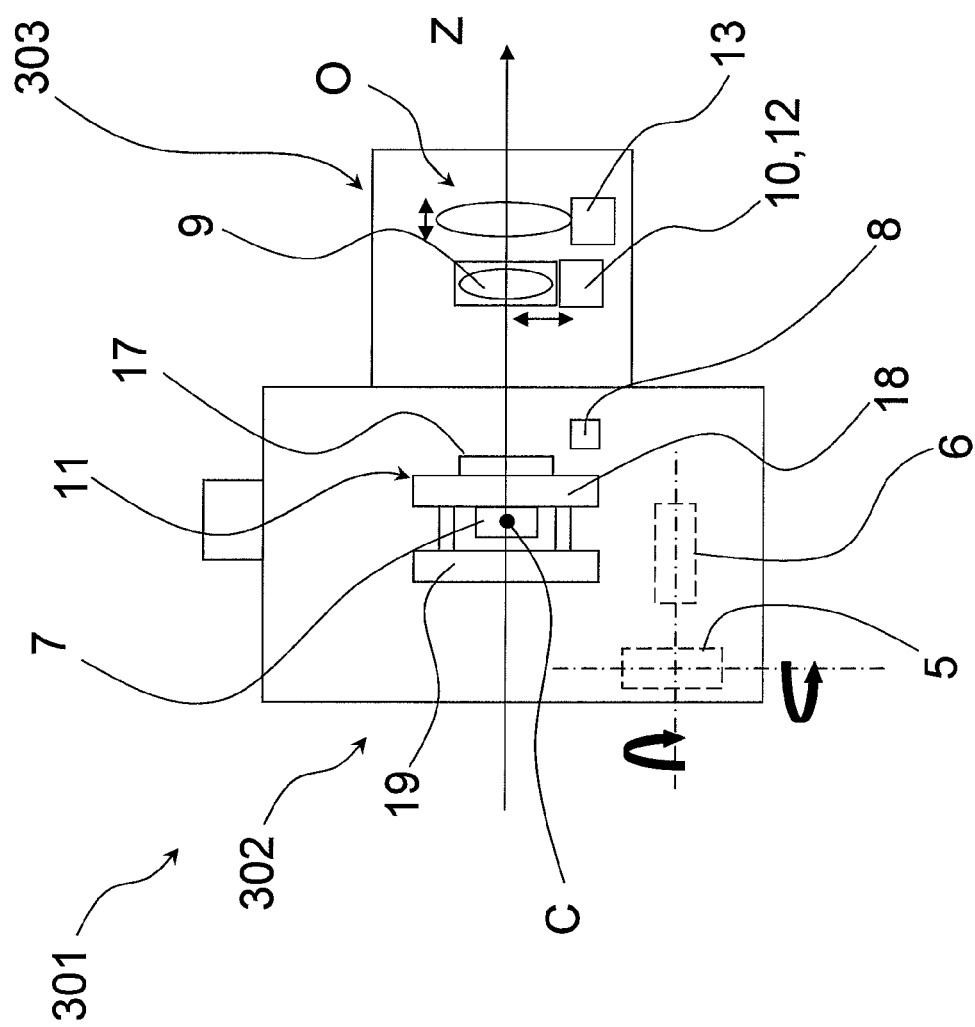
FIG. 32 is a simplified diagram of the configuration of a single lens reflex camera (other embodiment).

For example, as shown in FIG. 32, a single lens reflex camera 301 has a camera body 302 and an interchangeable lens 303 that can be mounted to the camera body 302. An imaging element 17, a range finder 8, first to third angular velocity sensors 4 to 6, an acceleration sensor 7, and a microcomputer 20 are installed in the camera body 302. An optical system O, a correcting lens 9, a first drive unit 10, a second drive unit 12, and a zoom drive unit 13 are installed in the interchangeable lens 303.

The same effect can be obtained with this single lens reflex camera 301 as with the above-mentioned camera 1.

The single lens reflex camera 301 shown in FIG. 32 is just an example, and its constituent elements such as the first to third angular velocity sensors 4 to 6, the acceleration sensor 7 and the microcomputer 20 may be provided to either the camera body 302 or the interchangeable lens 303.

Also, Examples of imaging devices such as the camera 1 and the single lens reflex camera 301 include those capable of only still picture imaging, those capable of only moving picture imaging, and those capable of both still picture and moving picture imaging.

The invention claimed is:

1. A camera, comprising:
an imaging optical system configured to form an optical image of a subject;
an imaging element configured to convert the optical image of the subject into an image signal;
a housing;
an image blur corrector configured to correct image blur caused by movement of the housing;
a displacement acquisition section configured to acquire the amount of displacement of the housing;
a rotary driver configured to rotationally drive the displacement acquisition section with respect to the housing;
a correction computer configured to calculate a first correction amount at the image blur corrector from the displacement amount acquired by the displacement acquisition section; and
a drive controller configured to control the operation of the rotary driver, and configured to control the operation of the image blur corrector on the basis of the first correction amount;
wherein:
the displacement acquisition section overlaps the rotational axis of the rotary driver when viewed along the optical axis of the imaging optical system;
the detection center of the displacement acquisition section substantially coincides with the rotational axis of the rotary driver when viewed along the optical axis;
the rotary driver has a rotor to which the imaging in element and the displacement acquisition section are integrally rotatably provided and a rotation actuator configured to drive the rotor with respect to the housing;
the imaging element is on the imaging optical system side of the rotor; and
the displacement acquisition section is disposed on the opposite side of the rotor from the imaging element and along the optical axis when viewed from the optical axis of the imaging optical system.

2. The camera according to claim 1, further comprising:
an angle acquisition section configured to acquire the rotational angle of the housing, wherein
the correction computer is configured to calculate a second correction amount at the image blur corrector from the rotational angle acquired by the angle acquisition section, using the position of the displacement acquisition section as a reference, and the drive controller is configured to control the operation of the image blur corrector on the basis of the first and second correction amounts.

3. The camera according to claim 1, further comprising:
an angle acquisition section configured to acquire the rotational angle of the housing, wherein
the imaging optical system includes a correcting optical system,
the image blur corrector has an optical system driver configured to drive the correcting optical system so that the optical path of the imaging optical system is changed, and an imaging element driver configure to drive the imaging element with respect to the housing so that the light receiving position of the optical image of the subject is changed, the correction computer is configured to calculate a second correction amount at the image blur corrector from the rotational angle acquired by the angle acquisition section, and the drive controller is configured to control the operation of the optical system driver on the basis of the first correction amount, and is configured to control the operation of the imaging element driver on the basis of the second correction amount.

4. The camera according to claim 1, further comprising:

an angle acquisition section configured to acquire the rotational angle of the housing, wherein the drive controller is configured to control the operation of the rotary driver so that the imaging element is rotationally driven with respect to the housing on the basis of the rotational angle acquired by the angle acquisition section.

5. A camera, comprising:

an imaging optical system configured to form an optical image of a subject;

a housing;

an image blur corrector configured to correct image blur caused by movement of the housing;

a displacement acquisition section configured to acquire the amount of displacement of the housing;

a rotary driver configured to rotationally drive the displacement acquisition section with respect to the housing;

a correction computer configured to calculate a first correction amount at the image blur corrector from the displacement amount acquired by the displacement acquisition section;

a drive controller configured to control the operation of the rotary driver, and configured to control the operation of the image blur corrector on the basis of the first correction amount;

an angle acquisition section configured to acquire the rotational angle of the housing; and an imaging element configured to be driven by the rotary driver along with the displacement acquisition section, and configured to convert the optical image of the subject into an image signal;

wherein:

the drive controller is configured to control the operation of the rotary driver so that the displacement acquisition section is rotationally driven with respect to the housing on the basis of the rotational angle acquired by the angle acquisition section;

the rotary driver has a rotor to which the imaging element and the displacement acquisition section are integrally rotatably provided, and a rotation actuator configured to drive the rotor with respect to the housing; and the imaging element is disposed on the imaging optical system side of the rotor, and the displacement acquisition section is disposed on the opposite side of the rotor from that of the imaging element and along the optical axis when viewed from the optical axis of the imaging optical system.

\* \* \* \* \*